United States Patent
Kurita et al.

(10) Patent No.: US 7,117,710 B2
(45) Date of Patent: Oct. 10, 2006

(54) REVERSE INPUT BLOCKING CLUTCH AND CLUTCH DEVICE USING THE SAME

(75) Inventors: Masahiro Kurita, Mie-ken (JP); Atsushi Yoshioka, Mie-ken (JP); Masahiro Kawai, Mie-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/703,490

(22) Filed: Nov. 10, 2003

(65) Prior Publication Data

US 2004/0089049 A1 May 13, 2004

Related U.S. Application Data

(62) Division of application No. 10/091,593, filed on Mar. 7, 2002, now Pat. No. 6,695,118.

(30) Foreign Application Priority Data

| Mar. 8, 2001 | (JP) | ............................... 2001-65239 |
| Aug. 9, 2001 | (JP) | .............................. 2001-242232 |
| Aug. 9, 2001 | (JP) | .............................. 2001-242258 |

(51) Int. Cl.
*B21K 1/76* (2006.01)
(52) U.S. Cl. .................................... 72/379.2
(58) Field of Classification Search ........... 29/894.362; 72/334, 336, 379.2; 192/223.2
See application file for complete search history.

(56) References Cited

U.S. PATENT DOCUMENTS

| 2,260,119 A * | 10/1941 | Marshall .................. 192/223.2 |
| 2,449,020 A | 9/1948 | Spraragen |
| 2,561,159 A * | 7/1951 | Walton ..................... 192/223.2 |
| 3,005,384 A | 10/1961 | Baird et al. |
| 3,011,606 A * | 12/1961 | Ferris et al. .................. 192/45 |
| 3,537,555 A | 11/1970 | Reister et al. |
| 4,070,895 A * | 1/1978 | Yamada et al. ................ 72/334 |
| 4,676,089 A * | 6/1987 | Nevin ........................ 72/355.4 |
| 4,899,569 A * | 2/1990 | Matsushita et al. ........... 72/336 |
| 4,901,831 A | 2/1990 | Ito et al. |
| 5,125,256 A * | 6/1992 | Ohkubo et al. ............... 72/340 |
| 5,248,017 A | 9/1993 | Schwarzbich |
| 5,315,442 A | 5/1994 | Sato et al. |
| 5,522,488 A | 6/1996 | Schwarzbich |
| 5,703,732 A | 12/1997 | Boddy et al. |
| 5,896,973 A * | 4/1999 | Hochmuth et al. ...... 192/223.2 |
| 5,952,802 A | 9/1999 | Pimley |
| 6,032,777 A | 3/2000 | Denis |

(Continued)

FOREIGN PATENT DOCUMENTS

EP 0 370 502 5/1990

(Continued)

*Primary Examiner*—Lowell A. Larson
(74) *Attorney, Agent, or Firm*—Arent Fox PLLC

(57) ABSTRACT

A reverse input blocking clutch comprises, as main elements, an input member, an output member, a stationary member for constraining the revolutions, locking means, lock release means and torque transmission means. By forming the input member, the output member, the stationary member and a fixed side plate from metal plates such as press worked steel plates, a compact, lightweight and low cost reverse input blocking clutch is provided. Reverse input torque from the output member is locked in both the forward and reverse rotational directions relative to the stationary member, by rollers which function as the locking means. Input torque from the input member in both the forward and reverse rotational directions is transmitted to the output member via apertures 1*d* and protrusions which function as the torque transmission means.

1 Claim, 24 Drawing Sheets

U.S. PATENT DOCUMENTS 6,132,050 A   10/2000   Sakata et al.
6,267,218 B1   7/2001   Hochmuth et al.
6,508,347 B1   1/2003   Hochmuth

FOREIGN PATENT DOCUMENTS

| EP | 0 752 360 | 1/1997 |
| EP | 0 884 494 | 12/1998 |
| WO | WO 99/10132 | 3/1999 |
| WO | WO 00/41914 | 7/2000 |

* cited by examiner

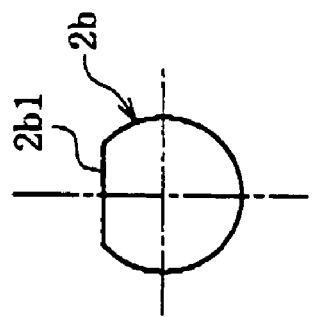
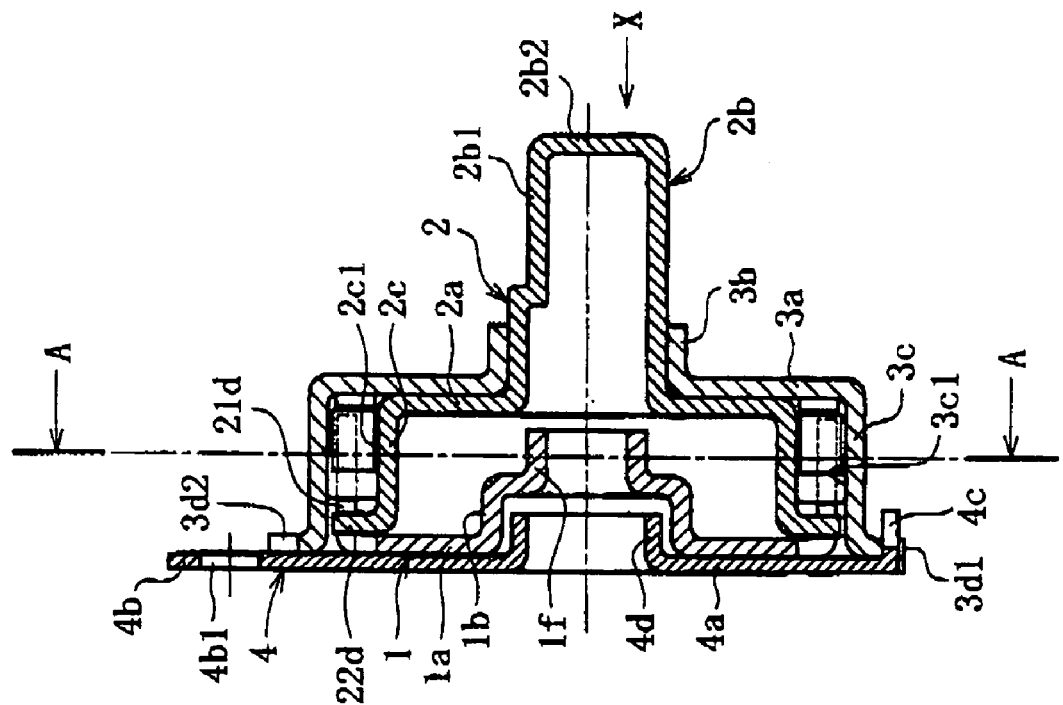
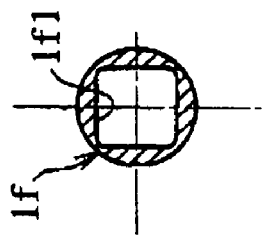

REVERSE INPUT BLOCKING CLUTCH AND CLUTCH DEVICE USING THE SAME

This is a Division of application Ser. No. 10/091,593 filed Mar. 7, 2002, now U.S. Pat. No. 6,695,118. The disclosure of the prior application is hereby incorporated by reference herein in its entirety.

BACKGROUND OF THE INVENTION

In devices which perform a desired operation by transmitting input torque from a rotational driving source such as a motor to an output mechanism, when the driving source is stopped, there are occasions in which it is desirable to block the transmission of reverse input torque from the output mechanism back to the input side.

An example of such an occasion is when a retention function is employed to prevent the position of the output mechanism fluctuating when the driving source is stopped. In this type of device, taking an electric shutter as an example, the input torque from the driving motor in either a forward or reverse direction is input to an opening and closing mechanism on the output side, which then performs the operation for either opening or closing the shutter, although if for some reason (such as a power failure or the like) the driving motor is stopped partway through the opening or closing operation, reverse input torque resulting from the descent of the shutter under its own weight is returned to the input side, resulting in the possibility of damage to the input side components. Consequently, a mechanism is required which holds the position of the shutter, and prevents the return of reverse input torque from the shutter to the input side.

Furthermore, in a construction in which a reduction gear is used to reduce the revolutions of a motor, the following problems may arise in those cases where, for some reason, torque is reverse input from the output side.

(a) In a case in which worm gearing is used as the reduction gear, then because rotation under reverse input is impossible with this type of worm gearing, a very large load is exerted on the worm wheel or the teeth of the worm. In particular, a very large thrust loading acts upon the worm. As a result, there is a danger of damage to the bearing supporting the teeth and the worm, or alternatively, the mechanism must be increased in size in order to prevent this type of damage.

(b) Even in the case of a reduction gear which utilizes a spur gear or a helical gear, there is still a possibility of damage to the teeth in those cases where the reverse input torque becomes excessively large (such as the case of a shocking reverse input).

In order to resolve the problems outlined above, a mechanism is required which is capable of transmitting input torque from the motor of the input side to the output side, but also capable of locking the output side with respect to reverse input torque from the output side, thereby preventing the return of reverse input torque to the motor or the reduction gear on the input side.

Furthermore in recent years, many vehicles including automobiles have been equipped with motor driven electric retractable door mirrors, wherein the mirror moves through an angle of approximately 90° between a working position in which the mirror protrudes out from the side of the vehicle, and a retracted storage position. A conventional electric retractable door mirror (such as that disclosed in Japanese Patent Laid-Open Publication No. Hei 11-51092) utilizes a driving mechanism such as that shown in FIG. 29, wherein a mirror 42 can be moved easily by driving a motor 41, but when an external force acts upon the mirror 42, a clutch 43 effectively blocks the external force, holding the mirror 42 firmly in place and preventing the external force from acting upon the motor 41.

However, in the driving mechanism disclosed in the above publication, because the mirror is securely fixed and undergoes no rotation even if an external force results in a reverse input torque acting upon the mirror, the mechanism is unable to absorb such an external force, and the mirror is consequently prone to damage. In order to resolve this problem, a mechanism is required which is capable of transmitting input torque from the motor of the input side to the mirror of the output side, but also permits the mirror to slip with respect to reverse input torque, thereby blocking the transmission of such reverse input torque back to the input side.

SUMMARY OF THE INVENTION

An object of the present invention is to provide a reverse input blocking clutch which has the functions described above, and yet is compact, lightweight and low cost, as well as a clutch device using such a reverse input blocking clutch.

In order to achieve this object, a reverse input blocking clutch of the present invention comprises an input member into which torque is input, an output member to which torque is output, a stationary member for constraining the revolutions, locking means provided between the stationary member and the output member for locking the output member and the stationary member with respect to reverse input torque from the output member, lock release means provided on the input member for releasing a locked state produced by the locking means with respect to input torque from the input member, and torque transmission means provided between the input member and the output member for transmitting input torque from the input member to the output member when the locked state produced by the locking means is released, wherein at least the input member from amongst the input member, the output member and the stationary member is produced by deformation processing of a metal plate.

The "locking means" described above incorporates a device which applies an antirotation force by means of a wedge engagement force, an engagement between concave and convex surfaces, frictional force, magnetic force, electromagnetic force, fluid pressure, fluid viscosity resistance or a fine particle medium or the like, although from the viewpoints of cost, the simplicity of the structure and the control mechanism, and the smoothness of operation a device which applies an antirotation force by means of a wedge engagement force is preferred.

Specifically, a wedge shaped gap is formed between the output member and the stationary member, and an engagement member is then either engaged into, or disengaged from this gap to switch the device between a locked state and a slipping state respectively. Furthermore, this type of construction includes structures in which a cam surface for forming the wedge shaped gap is provided on either the output member or the stationary member (and an engagement member with a circular cross section such as a roller or a ball is used), and structures in which a cam surface for forming the wedge shaped gap is provided on the engagement member (and a sprag or the like is used as the engagement member).

Furthermore, the "metal plate" described above may be any metal plate capable of being shaped by deformation processing to the desired shape and dimensions. There are no particular restrictions on the material used, and a steel plate is a suitable example. Furthermore, the deformation processing can utilize techniques such as press working.

According to the above construction, when input torque is input at the input member, first the locked state produced by the locking means is released by the lock release means, and with the device in this released state, the input torque from the input member is transmitted to the output member via the torque transmission means. In contrast, a reverse input torque from the output member is locked between the output member and the stationary member by the locking means. Accordingly, a function is achieved wherein input torque from the input side is transmitted to the output side, whereas reverse input torque from the output side is not returned to the input side. Furthermore, by producing at least the input member from amongst the input member, the output member and the stationary member, from a metal plate which has undergone deformation processing, then in comparison with forged products, cast products or cutout products, the device is more compact, lighter, and cheaper to produce.

In the above construction, a connector can be provided for connecting an input shaft to the input member, and this connector can be positioned inside the clutch. As a result, the dimensions of the clutch itself in an axial direction can be kept compact, and furthermore the overall dimensions in an axial direction upon assembly with the rotational driving source can also be kept compact. This connector is preferably provided on a cylindrical section which extends in a continuous manner from the inner perimeter of the input member towards the inside of the clutch, and is also provided with at least one flat surface section which engages with a flat surface on the input shaft. This engagement between the flat surface of the input shaft and the flat surface of the connector causes the input shaft and the input member to be connected in such a manner that prevents relative rotation.

Furthermore in the above construction, a cylindrical output shaft section can also be incorporated into the output member. By so doing, the weight of the output shaft section can be reduced, the number of components can be reduced, and the production cost can be lowered. The output shaft section should preferably be closed at one end. By so doing, the strength of the output shaft section relative to a radial load or a torsional torque can be increased, and so deformation can be prevented and durability improved. Furthermore, the output shaft section should also preferably comprise at least one flat surface which engages with a flat surface of another driven member (a rotating member of a mechanism or device connected to the output side). The engagement between the flat surface provided on this other driven member and the flat surface of the output shaft section causes the output shaft section and the other driven member to be connected in such a manner that prevents relative rotation. Alternatively, a spline section or a serrated section which engages with a corresponding section on the other driven member could also be provided on the output shaft section.

In the above construction, the locking means can comprise a circumferential surface provided on the stationary member, a cam surface provided on the output member for forming the wedge shaped gap in the directions of both forward and reverse rotation between the output member and the circumferential surface, a pair of engagement members positioned between the cam surface and the circumferential surface, and an elastic member for pressing the pair of engagement members in the direction of the wedge shaped gap, the lock release means can be an engagement element which engages with either one of the pair of engagement members and pushes that engagement member in a direction away from the wedge shaped gap, and the torque transmission means can comprise rotational engagement elements provided on the input member and the output member, wherein at the neutral positions of the lock release means and the torque transmission means, the gap $\delta 1$ in the direction of rotation between the engagement element of the lock release means and the engagement member, and the gap $\delta 2$ in the direction of rotation between the engagement elements of the torque transmission means exist in a relationship in which $\delta 1 < \delta 2$.

According to the above construction, when a reverse input torque of one direction is input at the output member, one of the pair of engagement members engages in the wedge shaped gap in that direction, and the output member is locked in that direction relative to the stationary member. In contrast, when a reverse input torque of the other direction is input at the output member, the other one of the pair of engagement members engages in the wedge shaped gap in that direction, and the output member is locked in the other direction relative to the stationary member. Consequently, the output member is locked in both the forward and reverse rotational directions relative to the stationary member by the actions of the pair of engagement members. In contrast, when input torque is input at the input member, first the engagement element provided as the lock release means on the input member pushes the engagement member which engages with the wedge shaped gap in the direction of the torque away from the wedge shaped gap, disengaging the engagement member from the wedge shaped gap. As a result, the locked state of the output member is released relative to the direction of the input torque. Subsequently, with the output member in this released state, the rotational engagement elements provided on the input member and the output member as the torque transmission means engage with one another. By so doing, the input torque input at the input member is transmitted from the input member to the torque transmission means (the rotational engagement elements) and through to the output member, causing the output member to rotate.

By setting the relationship between the gap $\delta 1$ in the direction of rotation between the engagement element of the lock release means and the engagement member, and the gap $\delta 2$ in the direction of rotation between the engagement elements of the torque transmission means, so that at the neutral positions of the lock release means and the torque transmission means $\delta 1 < \delta 2$, the lock release process provided by the aforementioned lock release means and the torque transmission process provided by the torque transmission means can be carried out consecutively and reliably.

In the above construction, the torque transmission means may comprise a convex section provided on either one of the input member and the output member, and a matching concave section provided on the other member. Specifically, a protrusion comprising the convex section can be provided on the output member, and a notch or a cavity comprising the concave section provided on the input member. In such a case, the protrusion may either protrude out in a radial direction or in an axial direction. Moreover, the cam surface may be formed directly on the output member, or alternatively a separate member with a cam surface may be attached to the output member. Furthermore, a roller should preferably be used as the engagement member.

In the above construction, the aforementioned elastic member could comprise a base and a tongue section extending from the base in either one of the axial directions, wherein the tongue section is positioned between the pair of engagement members and pushes the pair of engagement members mutually apart. The elastic member should preferably comprise an integrated ring, namely, a ring shaped base with a plurality of tongues positioned around the circumference of the ring, as such a structure enables a reduction in the number of components, and a consequent lowering of the production cost.

In the above construction, a fixed side plate can be fixed to the stationary member, with this fixed side plate produced from a metal plate which has undergone deformation processing. In such a case, the bearing supporting the input shaft in a radial direction can be integrated into this fixed side plate. As a result, the operation of rotating the input shaft and the input member can be performed smoothly and with good stability, and the application of an unbalanced load to the locking means can be prevented or suppressed, thereby enabling a more stable clutch operation. Moreover, although this bearing may also be constructed by providing a separate rolling bearing or sliding bearing, the integrated structure described above enables a simpler structure and a reduced number of components. This bearing should preferably be provided on a cylindrical section extending in a continuous manner from the inner perimeter of the fixed side plate towards the inside of the clutch.

Furthermore in order to resolve the problems described above, a clutch device of the present invention is an integrated unit comprising a rotational driving source and a reverse input blocking clutch. The reverse input blocking clutch comprises an input member into which torque from the rotational driving source is input, an output member to which torque is output, a stationary member for constraining the revolutions, locking means provided between the stationary member and the output member for locking the output member and the stationary member with respect to reverse input torque from the output member, lock release means provided on the input member for releasing a locked state produced by the locking means with respect to input torque from the input member, and torque transmission means for transmitting input torque from the input member to the output member when the locked state produced by the locking means is released.

According to the above construction, when input torque from the rotational driving source is input at the input member of the reverse input blocking clutch, first the locked state produced by the locking means is released by the lock release means, and with the device in this released state, the input torque from the input member is transmitted to the output member via the torque transmission means. In contrast, a reverse input torque from the output member is locked between the output member and the stationary member by the locking means.

Accordingly, a function is achieved wherein input torque from the input side is transmitted to the output side, whereas reverse input torque from the output side is not returned to the rotational driving source of the input side. Furthermore, by producing this reverse input clutch as an integrated unit with the rotational driving source, the deleterious effects of reverse input torque on the rotational driving source can be avoided, and a clutch device (rotational driving device) can be provided which is lightweight, Compact, and cheap to produce.

Furthermore, the same effects can be achieved with an integrated clutch device (rotational driven device) comprising (1) a reverse input blocking clutch comprising an input member into which torque from the rotational driving source is input, an output member to which torque is output, a stationary member for constraining the revolutions, locking means provided between the stationary member and the output member for locking the output member and the stationary member with respect to reverse input torque from the output member, lock release means provided on the input member for releasing a locked state produced by the locking means with respect to input torque from the input member, and torque transmission means for transmitting input torque from the input member to the output member when the locked state produced by the locking means is released, and (2) an output mechanism for performing a desired operation using the torque transmitted to the output member of the reverse input blocking clutch.

What is described above as a "rotational driving source" refers to a device for generating rotational torque, and includes motors, engines, and hand operated members such as handles, as well as combinations of such devices with reduction gears.

Furthermore, by producing at least the input member from amongst the input member, the output member and the stationary member of the reverse input blocking clutch, from a metal plate which has undergone deformation processing, then in comparison with forged products, cast products or cutout products, the device is more compact, lighter, and cheaper to produce.

In the above construction, a connector can be provided for connecting an output shaft of the rotational driving source to the input member, and this connector can be positioned inside the clutch. As a result, the dimensions of the clutch itself in an axial direction can be kept compact, and furthermore the overall dimensions of the aforementioned clutch device in an axial direction can also be kept compact. This connector is preferably provided on a cylindrical section which extends in a continuous manner from the inner perimeter of the input member towards the inside of the clutch, and is also provided with at least one flat surface section which engages with a flat surface on the output shaft of the rotational driving source. This engagement between the flat surface provided on the output shaft of the rotational driving source and the flat surface of the connector causes the output shaft and the input member to be connected in such a manner that prevents relative rotation.

Furthermore, at least one flat surface which engages with a flat surface of a driven member of an output mechanism may also be provided on the output shaft section. The engagement between the flat surface provided on this driven member and the flat surface of the output shaft section causes the output shaft and the other driven member to be connected in such a manner that prevents relative rotation. Alternatively, a spline section or a serrated section which engages with a corresponding section on the driven member of the output mechanism could also be provided on the output shaft section.

In the above construction, the locking means of the reverse input blocking clutch comprises a circumferential surface provided on the stationary member, a cam surface provided on the output member for forming a wedge shaped gap in the directions of both forward and reverse rotation between the output member and the circumferential surface, a pair of engagement members positioned between the cam surface and the circumferential surface, and an elastic member for pressing the pair of engagement members in the direction of the wedge shaped gap. The lock release means is an engagement element which engages with either one of the pair of engagement members and pushes that engagement member in a direction away from the wedge shaped gap, and the torque transmission means comprises rotational engagement elements provided on the input member and the output member. At the neutral positions of the lock release means and the torque transmission means, the gap δ1 in the direction of rotation between the engagement element of the lock release means and the engagement member, and the gap δ2 in the direction of rotation between the engagement elements of the torque transmission means exist in a relationship in which δ1<δ2.

Furthermore, in order to resolve the problems described above, a clutch device according to the present invention is a device for moving a driven member between at least two predetermined prescribed positions, incorporating a rotational driving source, a reverse input blocking clutch comprising an input member into which torque from the rotational driving source is input, and an output member connected to the driven member, for transmitting input torque applied to the input member to the output member, while blocking the transmission of reverse input torque applied at the output member to the input member and permitting the slipping of the output member, and restraining means for elastically restraining the rotation of the output member at each of the prescribed positions.

According to such a construction, input torque applied from the rotational driving source to the input member is transmitted to the output member of the reverse input blocking clutch, and this rotational torque causes the driven member to move between the two (or three or more) prescribed positions. When the driven member reaches each prescribed position, the rotation of the output member is restrained elastically by the restraining means, and so the driven member resists external forces and is retained in that position. However, if the external force becomes very large and the reverse input torque reaches a level exceeding the elastic rotational restraining force of the restraining means, then the output member overcomes this rotational restraining force and begins to rotate. Here, because the reverse input blocking clutch is of a construction which permits the slipping of the output member relative to reverse input torque, this slipping of the output member enables the driven member to be freely rotated, and this free rotation in turn enables the absorption of the external force acting upon the driven member. Furthermore, because the reverse input blocking clutch blocks the transmission of reverse input torque to the input member, damage to the rotational driving source resulting from large reverse input-torque can be prevented.

In addition, the reverse input blocking clutch may also comprise a torque transmission member which can be engaged with and disengaged from the input member and the output member in the directions of both forward and reverse rotation, a retainer for retaining the torque transmission member and controlling the engagement and disengagement of the torque transmission member through relative rotation relative to the input member, a first elastic member for connecting the input member and the retainer in a rotational direction, a stationary member, and rotational resistance application means for applying sliding frictional resistance to the retainer for rotation of the retainer relative to the stationary member.

According to the above construction, when rotational torque from the rotational driving source is input at the input member of the reverse input blocking clutch, the input member and the retainer connected to the input member begin to rotate via the first elastic member. Accompanying this rotation, a sliding frictional resistance acts upon the retainer due to the action of the rotational resistance application means, and consequently the retainer is subject to rotational resistance and develops a rotational lag, undergoing relative rotation with respect to the input member (at this point, the first elastic member is subject to elastic deformation). With the retainer in this state of rotational lag, the torque transmission member engages with both the input member and the output member, and the rotational torque input at the input member is transmitted to the output member via the torque transmission member.

In contrast, sliding fractional resistance from the rotational resistance application means does not act upon the retainer with respect to rotational torque input from the output member (reverse input torque), and so the elastic action of the first elastic member causes centering of the retainer. With the retainer in this centered state, the torque transmission member does not engage with either the input member or the output member, but remains freely rotatable, and consequently the output member is able to slip in a disengaged manner.

The above operation can be achieved by forming a wedge shaped gap between the input member and the output member, and then causing an engagement member which functions as the torque transmission member to engage with, or disengage from this wedge shaped gap. This type of construction includes structures in which the cam surface for forming the wedge shaped gap is provided on either the output member or the input member (and an engagement member with a circular cross section such as a roller or a ball is used), and structures in which the cam surface for forming the wedge shaped gap is provided on the engagement member (and a sprag or the like is used as the engagement member).

The aforementioned restraining means may comprise, for example, a concave engagement section provided on either one of the output member or the stationary member, and a convex engagement section provided on the other member, wherein the engagement section of the stationary member is positioned over the rotational locus of the engagement section of the rotating side, and at each of the prescribed positions the concave engagement section and the convex engagement section engage elastically, thereby restricting the rotation of the output member.

According to such a construction, if the output member is rotated by torque applied to the input member, then at the point where the concave engagement section and the convex engagement section reach opposing positions, the two sections will elastically engage in a circumferential direction, and so rotation of the output member beyond that point is restricted. However, if a large reverse input torque exceeding the rotational restraining force of the restraining means is applied to the output member, then the engagement between the concave engagement section and the convex engagement section releases, and the output member begins to slip freely.

This type of construction can be realized, for example, by providing the concave engagement section on the stationary member, and providing the convex engagement section on the output member with a second elastic member disposed therebetween. In such a case, the concave engagement section and the convex engagement section engage through the elastic force supplied by the second elastic member. If a large reverse input torque exceeding the torque reaction force provided by this elastic force is applied to the output member, then the output member can be caused to slip, and rotate freely.

If the output member and the stationary member are arranged so as to oppose one another in an axial direction, with the concave engagement section and the convex engagement section engage positioned within the opposing section, then the restraining means can be integrated within the structure of the reverse input blocking clutch, enabling a more compact overall device to be produced.

In those cases in which a motor is used as the rotational driving source, then when the concave engagement section and the convex engagement section engage (not only immediately following engagement, but also immediately prior to engagement), the driving current of the motor increases. Consequently, if the motor is stopped at the point when this increase in driving voltage is detected, then the driven member can be accurately stopped at each of the prescribed positions without the use of a sensor.

The rotational resistance application means may comprise a sliding member capable of engaging in a circumferential direction with one of either the retainer or the stationary member, and sliding relative to the other. For example, the sliding member could be provided so as to slide relative to the stationary member while being engaged in a circumferential direction with the retainer.

The driven member could be, for example, a mirror of a vehicle. In such a case, one of the two prescribed positions could be set as' a working position in which the mirror protrudes out from the side of the vehicle, and the other position set as a retracted storage position.

BRIEF DESCRIPTION OF THE DRAWINGS

FIG. 1c is a view of an output shaft along the direction of the arrow X in FIG. 1a;

FIG. 10a is a longitudinal sectional view (a cross-sectional view taken along the line B—B of FIG. 11) of a reverse input blocking clutch according to a second embodiment, FIG. 10b is a transverse sectional view of a connector, and FIG. 10c is a view of an output shaft along the direction of the arrow X in FIG. 10a;

FIG. 21a is a front view of an input outer ring viewed from a direction A shown in FIG. 21b, and FIG. 21b is a cross-sectional view taken along the line B—B shown in FIG. 21a;

FIG. 23c is a cross-sectional view taken along the line C—C of FIG. 23a, and FIG. 23d is a front view viewed from a direction D shown in FIG. 23a;

FIG. 27b is a cross-sectional view taken along the line A—A of FIG. 27a;

FIG. 28b is a cross-sectional view taken along the line A—A of FIG. 28a.

DETAILED DESCRIPTION OF THE PREFERRED EMBODIMENTS

As follows is first a description, with reference to the drawings, of embodiments of a clutch (locking type) for blocking the return of reverse input torque to the input side by locking the output member relative to the reverse input torque.

Figure 1C:
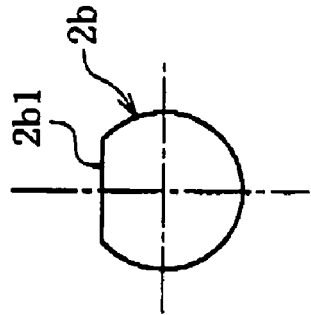
Figure 1A:
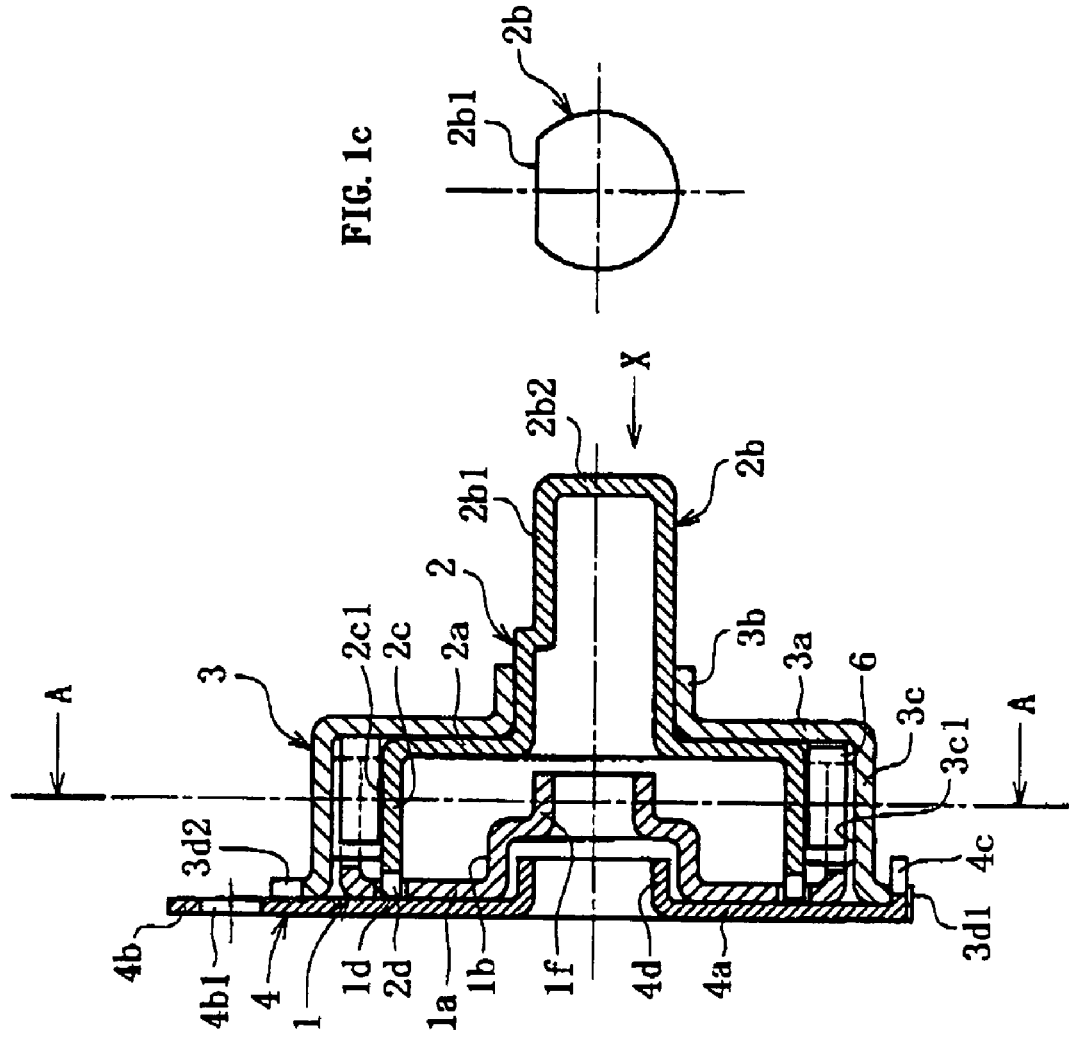
FIG. 1a is a longitudinal sectional view (a cross-sectional view taken along the line B—B of FIG. 2) of a reverse input blocking clutch according to a first embodiment.
Figure 1B:
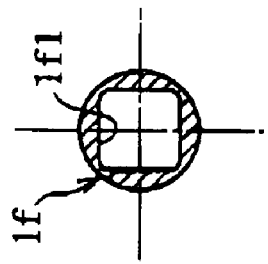
FIG. 1b is a transverse sectional view of a connector.
Figure 2:
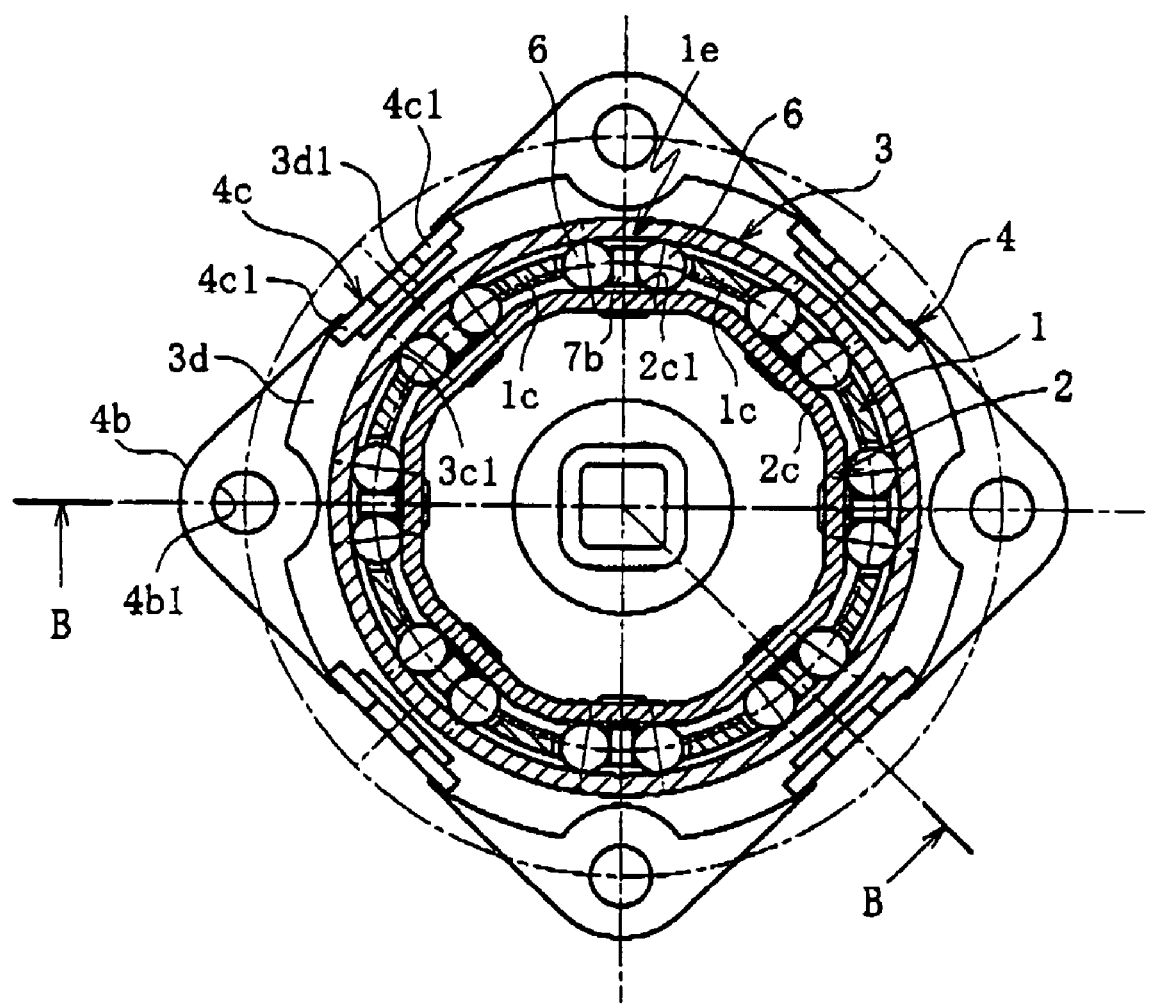
FIG. 2 is a transverse sectional view (a cross-sectional view taken along the line A—A of FIG. 1a) showing the reverse input blocking clutch according to the first embodiment.

FIG. 1 and FIG. 2 show the overall configuration of a first embodiment of the reverse input blocking clutch described above. The clutch of this embodiment comprises, as main elements, an input member 1 into which torque is input, an output member 2 to which torque is output, a stationary member 3 for constraining the revolutions, a fixed side plate 4 fixed to the stationary member 3, and locking means, lock release means and torque transmission means which are described below. The input member 1, the output member 2, the stationary member 3 and the fixed side plate 4 are formed from metal plates such as press worked steel plates (members formed by press working).

Figure 3:
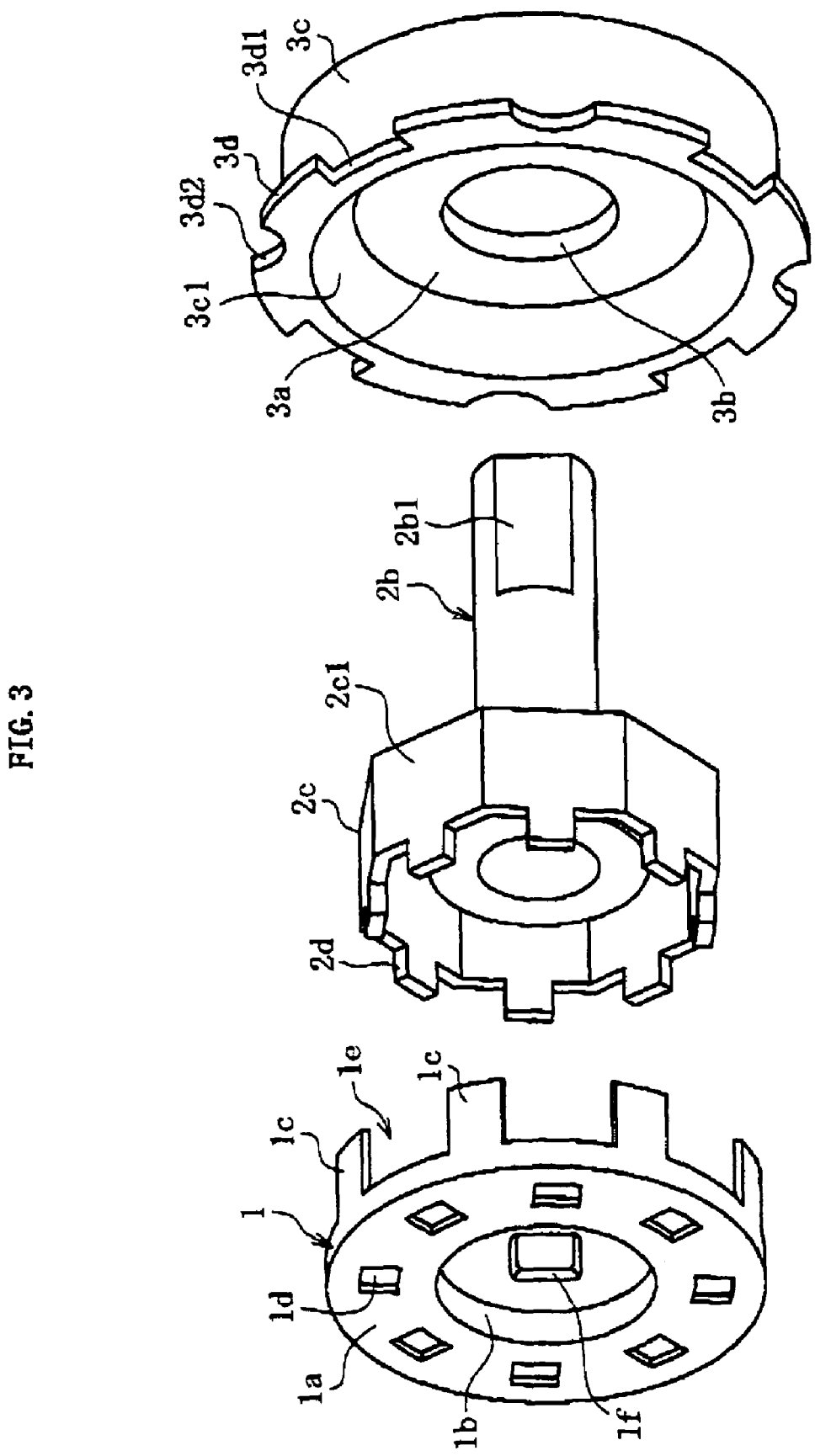
FIG. 3 is a perspective view of an input member, an output member and a stationary member.

As shown in FIG. 1 and FIG. 3, the input member 1 comprises mainly a flange section 1a which extends in a radial direction, a cylindrical section 1b which extends in a continuous manner in one axial direction (towards the inside of the clutch) from the inner perimeter of the is flange section 1a, a plurality (eight for example) of pillars 1c which extend in a continuous manner in one axial direction from the outer perimeter of the flange section 1a, and a plurality (eight for example) of apertures 1d formed in the flange section 1a.

The pillars 1c and the apertures 1d are both positioned with equidistance around the circumference. Moreover, the positions of the pillars 1c and the positions of the apertures 1d are mutually staggered around the circumference, and in this example an aperture 1d is positioned centrally between each pair of adjacent pillars 1c. The spaces between adjacent pillars 1c in a circumferential direction form a plurality of pockets 1e which are open in one axial direction, and a pair of rollers 6, which are described below, are positioned within each pocket 1e.

The cylindrical section 1b is positioned inside the clutch, and the tip section thereof comprises a connector 1f with a slightly narrowing diameter. In this embodiment, the internal periphery of the connector 1f is polygonal in shape, such as the square shape shown in FIG. 1b, with four flat sections 1f1 formed by the four sides of the square respectively. A connector of an input shaft, not shown in the drawings, (such as the output shaft of a motor or a motor with a reduced gear) is connected to the connector 1f. The outer perimeter of the input shaft is of a polygonal shape, such as a square shape, which matches the internal periphery of the connector 1f, and has four flat sections formed by the four sides of the square respectively. Then, by engaging each of the flat sections formed on the connector of the input shaft with each of the flat sections 1f1 of the connector 1f, the input shaft and the input member 1 are connected in a manner that prevents relative rotation. Moreover, the connector 1f may also be shaped so that not only the inner perimeter, but also the overall shape through the thickness of the connector 1f is a polygonal shape such as a square shape. Furthermore, the connector of the input shaft and the connector 1f may also be constructed so as to engage via a single flat surface provided on each connector, or via two flat surfaces formed 180° apart on opposing sides of each connector.

The output member 2 comprises mainly a flange section 2a which extends in a radial direction, a cylindrical output shaft section 2b which extends in a continuous manner in one axial direction (towards the inside of the clutch) from the inner perimeter of the flange section 2a, a large diameter section 2c which extends from the outer perimeter of the flange section 2a in a continuous manner in the opposite axial direction, and a plurality (eight for example) of protrusions 2d which protrude in an axial direction from one edge of the large diameter section 2c.

One flat surface 2b1, for example, is provided at the end of the shaft of the output shaft section 2b, and this end of the shaft is connected to a driven member of an output mechanism or a device not shown in the drawings. Then, by engaging the flat section 2b1 at the end of the shaft with a flat section formed on the aforementioned driven member, the output shaft section 2b and the driven member are connected in a manner that prevents relative rotation. Moreover, the end of the shaft and the driven member may also be constructed so that engagement occurs via a plurality of flat surfaces, by either providing two flat surfaces 2b1 180° apart on opposing sides of the end of the shaft, or forming the end of the shaft in a polygonal shape. Furthermore, the end of the shaft of the output shaft section 2b is closed by an end section 2b2.

The large diameter section 2c is formed in a polygonal shape such as a regular octagon, with the outer surface of each side of the polygon functioning as a cam surface 2c1. Accordingly, eight cam surfaces 2c1 are arranged uniformly around the outer periphery of the large diameter section 2c with an equal spacing between surfaces.

Figure 4:
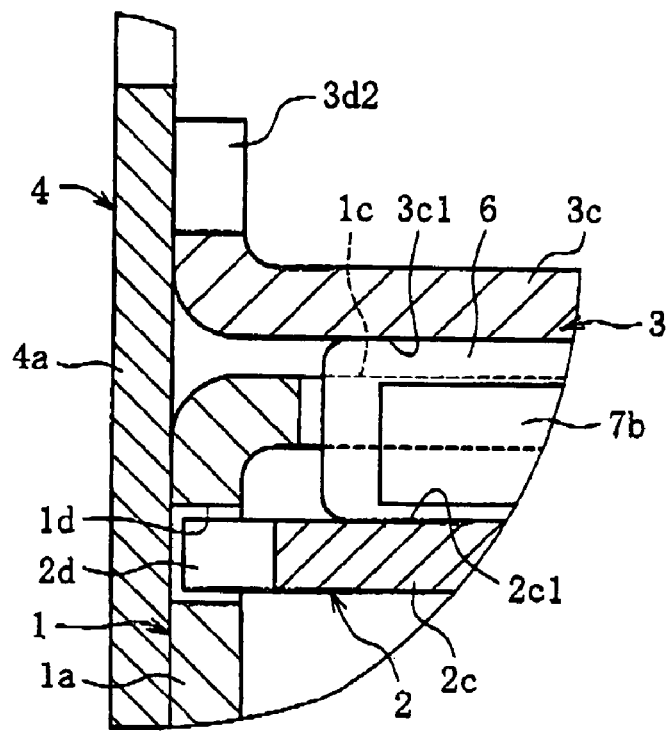
FIG. 4 is an enlarged longitudinal sectional view showing the outer periphery of torque transmission means (a notch in the input member and a protrusion on the output member)
Figure 5:
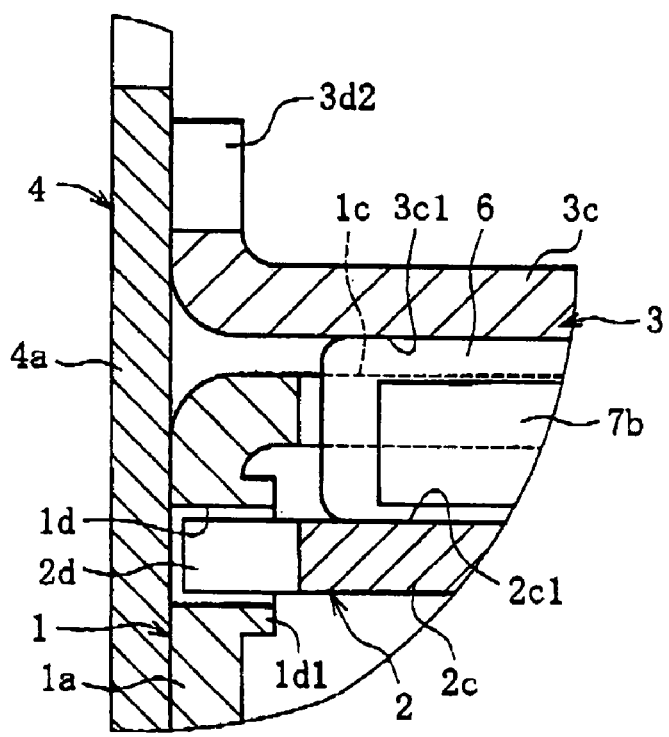
FIG. 5 is an enlarged longitudinal sectional view showing the outer periphery of torque transmission means (a notch in the input member and a protrusion on the output member) according to another example.
Figure 7:
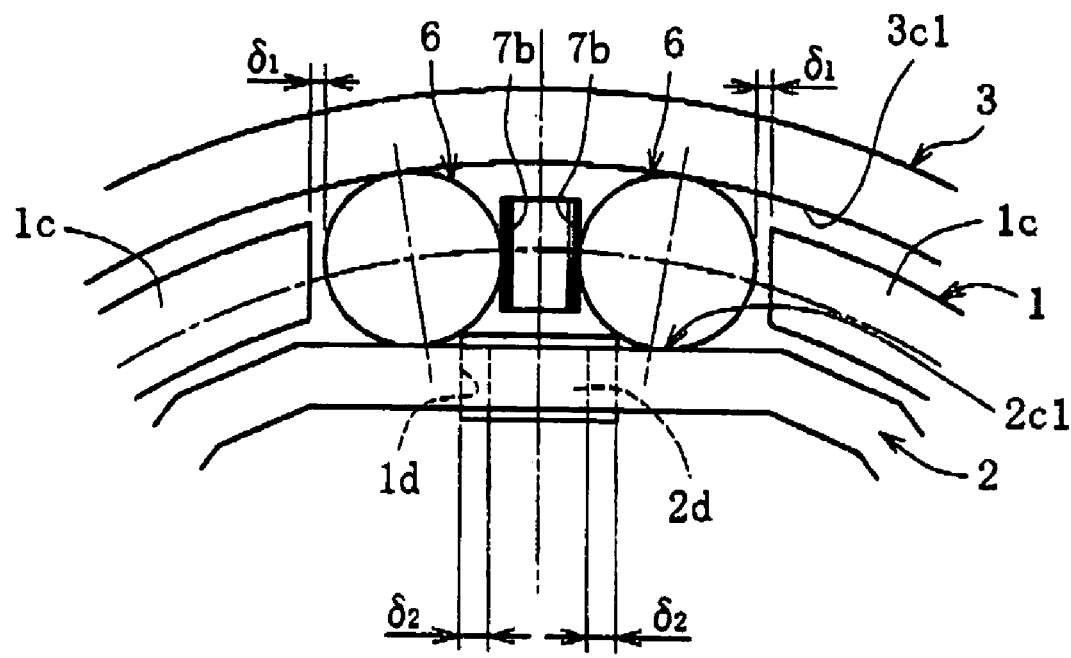
FIG. 7 is a partially enlarged transverse sectional view describing the operation of the reverse input blocking clutch according to the first embodiment (neutral position)

As can be seen in the enlarged view of FIG. 4, each of the protrusions 2d of the output member 2 is inserted into one of the apertures 1d of the input member 1 with a gap in the direction of rotation (the rotational gap 62 shown in FIG. 7). Moreover, as shown in FIG. 5, each aperture 1d may be subjected to burring, forming a built up section 1d1. By so doing, the protrusions 2d and the apertures 1d can be securely engaged relative to the direction of rotation.

The stationary member 3 comprises mainly a flange section 3a which extends in a radial direction, a cylindrical section 3b which extends in a continuous manner in one axial direction from the inner perimeter of the flange section 3a, a large diameter section 3c which extends from the outer perimeter of the flange section 3a in the opposite axial direction, and a collar section 3d extending radially outward from one edge of the large diameter section 3c.

The flange section 3a is mounted against the outside surface of the flange section 2a of the output member 2, and the cylindrical section 3b functions as a bearing (sliding bearing) for supporting the outer surface of the output shaft section 2b of the output member 2 in a manner which enables free rotation in an axial direction.

The large diameter section 3c is provided with an inner surface 3c1 which faces the cam surfaces 2c1 of the output member 2 in a radial direction, forming wedge shaped gaps in the directions of both forward and reverse rotation.

A plurality (four for example) of rectangular notches 3d1 and a plurality (four for example) of circular arc shaped notches 3d2 are formed with equidistance around the collar section 3d. The notches 3d1 match lugs 4c provided on the fixed side plate 4 described below. The notches 3d2 are provided to prevent interference with the mounting bolts fitted to brackets 4b of the fixed side plate 4.

As shown in FIG. 1 and FIG. 2, the fixed side plate 4 comprises mainly a flange section 4a which extends in a radial direction, a plurality (four for example) of brackets 4b which extend radially outward from the outer periphery of the flange section 4a, a plurality (four for example) of lugs 4c which extend in one axial direction from the outer periphery of the flange section 4a, and a cylindrical section 4d which extends in a continuous manner in one axial direction (towards the inside of the clutch) from the inner perimeter of the flange section 4a.

The flange section 4a is mounted against the outside surface of the flange section 1a of the input member 1. The four brackets 4b are formed with equidistance around the periphery of the flange section 4a, and are each provided with a through hole 4b1. Mounting bolts not shown in the drawings are inserted through these through holes 4b1.

The four lugs 4c are also formed with equidistance around the periphery, and are each equipped with a pair of forked claws 4c1 (refer to FIG. 2). The lugs 4c engage in the notches 3d1 of the stationary member 3, and the pair of claws 4c1 push back in opposing circumferential directions, thereby fastening onto the collar section 3d of the stationary member 3. As a result, the stationary member 3 and the fixed side plate 4 are connected in such a manner that prevents relative movement in both the axial direction and the rotational direction.

The cylindrical section 4d is inserted inside the cylindrical section 1b of the input member 1, and functions as a bearing (sliding bearing) for supporting the outer surface of an input shaft, not shown in the drawings, in a manner which permits free rotation in a radial direction.

As shown in FIG. 2, a pair of rollers 6 which function as engagement members are positioned in each space between the cam surfaces 2c1 of the output member 2 and the inner surface 3c1 of the stationary member 3 (giving a total of eight pairs, for example), and these rollers are housed within the pockets 1e formed between the pillars 1c of the input member 1. A tongue 7b of an elastic member 7 described below is positioned between each pair of rollers 6, and pushes the two rollers 6 mutually apart the combination of the cam surfaces 2c1, the inner surface 3c1, the pairs of rollers 6, and the tongues 7b of the elastic member 7 forms the locking means, whereas the lock release means is formed from the pillars 1c (engagement elements) of the input member 1 positioned on both sides of each pair of rollers 6 in a circumferential direction, and the torque transmission means is formed from the apertures 1d of the input member 1 and the protrusions 2d of the output member 2 which are inserted therein. Grease or the like may be used to fill the space between the outer surface of the output member 2 and the inner surface of the stationary member 3, particularly the space between the cam surfaces 2c1 and the inner surface 3c1.

Figure 6A:
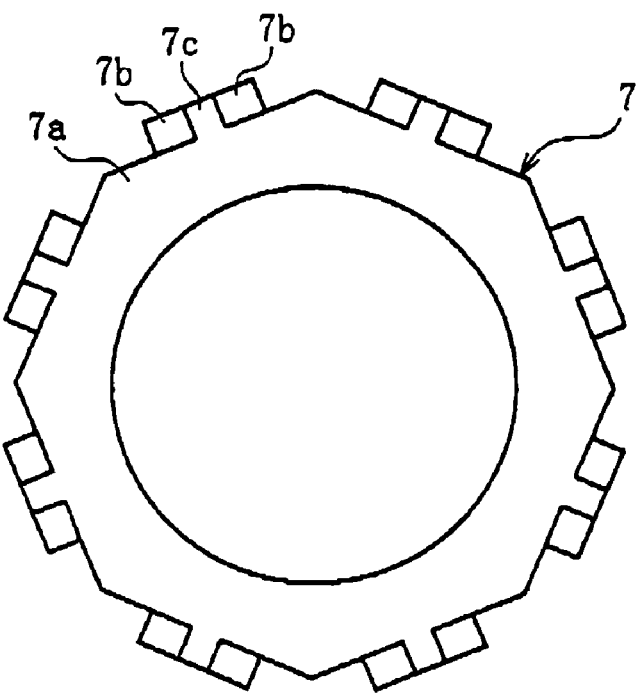
FIG. 6a is a front view showing an elastic member.
Figure 6B:
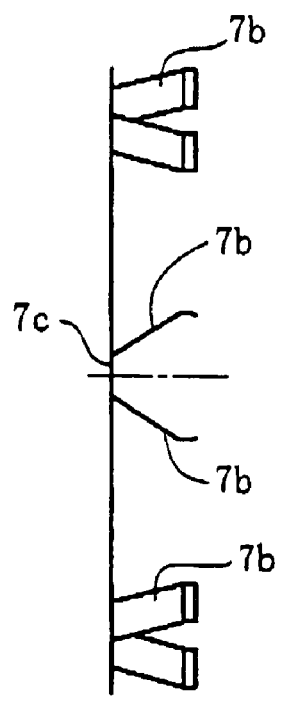
FIG. 6b is a view from the outer periphery.

As shown in FIG. 6, the elastic member 7 is provided with a base 7a, and tongue sections 7b extending from the base 7a in one axial direction. The elastic member 7 is formed from a single integrated ring, and a plurality of pairs of tongue sections 7b are positioned with equidistance around the periphery of this ring shaped base 7a. The elastic member 7 is formed from a metal plate such as a press worked spring steel plate.

Figure 6C:
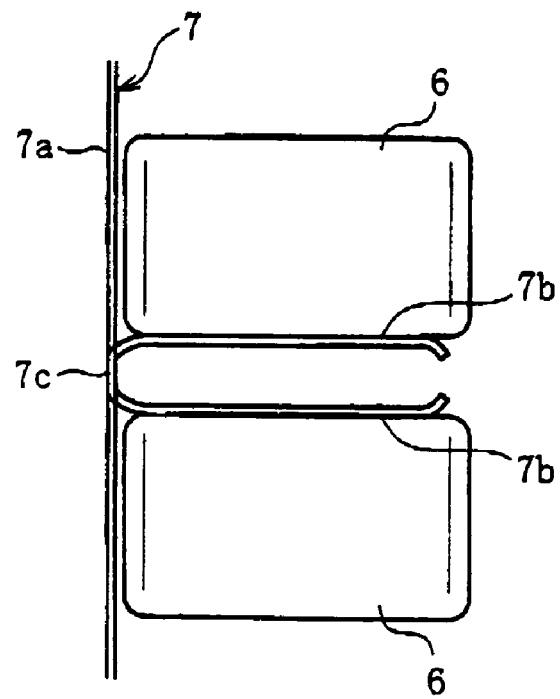
FIG. 6c is an enlarged view showing a tongue section positioned between a pair of rollers.

In this embodiment, the outer periphery of the base 7a is a regular octagonal shape, with one pair of tongue sections 7b provided on each side of this octagon. Each pair of tongue sections 7b is formed into a curved shape by cutting and lifting a portion of each side of the base 7a, and is connected to the base 7a via a protruding section 7c. As shown in FIG. 6c, a pair of tongue sections 7b is sandwiched between a pair of rollers 6, and pushes the two rollers 6 mutually apart in an elastic manner.

As can be seen in the enlarged view of FIG. 7, at the neutral position, the pair of rollers 6 are pushed mutually apart by the action of the tongue section 7b of the elastic member 7, and both engage with the wedge shaped gap formed between the cam surface 2c1 and the inner surface 3c1 in the directions of both forward and reverse rotation. At this time, a gap $\delta_1$ exists in the direction of rotation between each pillar 1c of the input member 1 and each of the rollers 6. Furthermore, a gap $\delta_2$ also exists in the directions of both forward and reverse rotation between the protrusion 2d of the output member 2 and the aperture 1d of the input member 1. The relationship between the rotational gap $\delta_1$ and the rotational gap $\delta_2$ is such that $\delta_1<\delta_2$. The size of the rotational gap $\delta_1$ is typically from 0 to 0.4 mm (an angle of 0 to 1.5° about the central axis of the clutch), and the size of the rotational gap $\delta_2$ is typically from 0.4 to 0.8 mm (an angle of 1.8 to 3.7° about the central axis of the clutch).

With the device in the state shown in FIG. 7, if a reverse input torque of a clockwise direction is input at the output member 2, then the roller 6 on the counter clockwise side (the rear roller relative to the rotational direction) engages with the wedge shaped gap on that side, and the output member 2 is locked in the clockwise direction relative to the stationary member 3. If a reverse input torque of a counter clockwise direction is input at the output member 2, then the roller 6 on the clockwise side (the rear roller relative to the rotational direction) engages with the wedge shaped gap on that side, and the output member 2 is locked in the counter clockwise direction relative to the stationary member 3. Consequently, reverse input torque-from the output member 2 is locked by the rollers 6 in the directions of both forward and reverse rotation.

Figure 8:
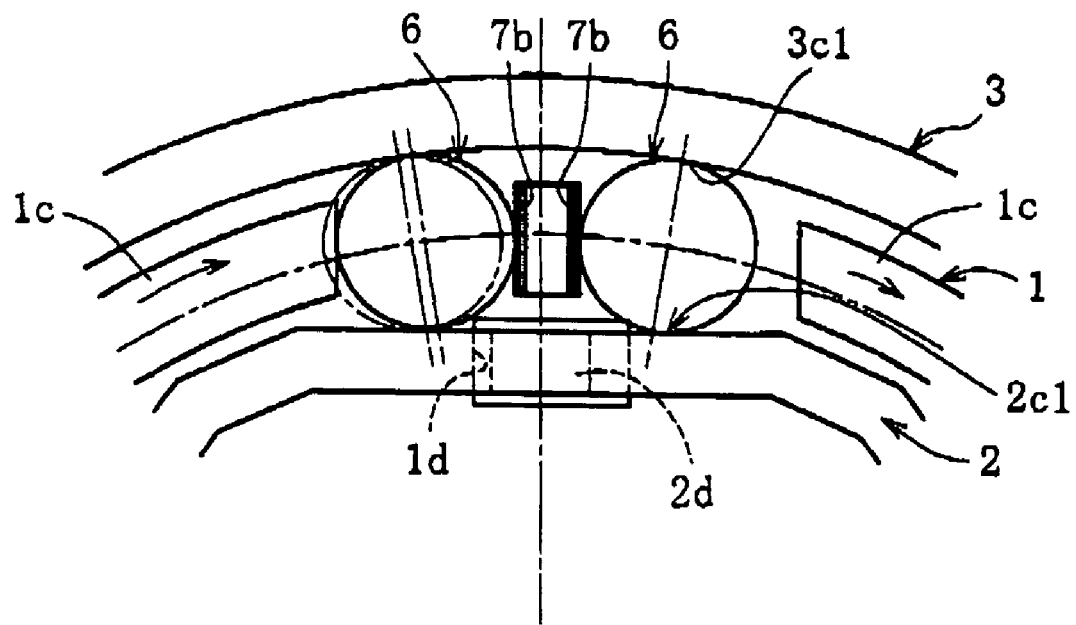
FIG. 8 is a partially enlarged transverse sectional view describing the operation of the reverse input blocking clutch according to the first embodiment (during lock release)

FIG. 8 shows the initial state in the situation where an input torque (in a clockwise direction in the figure) is input at the input member 1, and the input member 1 begins to rotate in the clockwise direction as shown in the figure. Because the aforementioned rotational gaps are set so that $\delta_1<\delta_2$, first, the pillar 1c on the counterclockwise side (the rear pillar relative to the rotational direction) of the input member 1 engages with the roller 6 on that side (the rear roller relative to the rotational direction), and presses that roller in a clockwise direction (in the direction of rotation) against the elastic force of the tongue section 7b. As a result, this roller 6 on the counter clockwise side (the rear roller relative to the rotational direction) disengages from the wedge shaped gap on that side, and the locked state of the output member 2 is released. {Moreover, the roller 6 on the clockwise side (the front roller relative to the rotational direction) does not engage with the wedge shaped gap on that side}. Consequently, the output member 2 is able to rotate in a clockwise direction.

Figure 9:
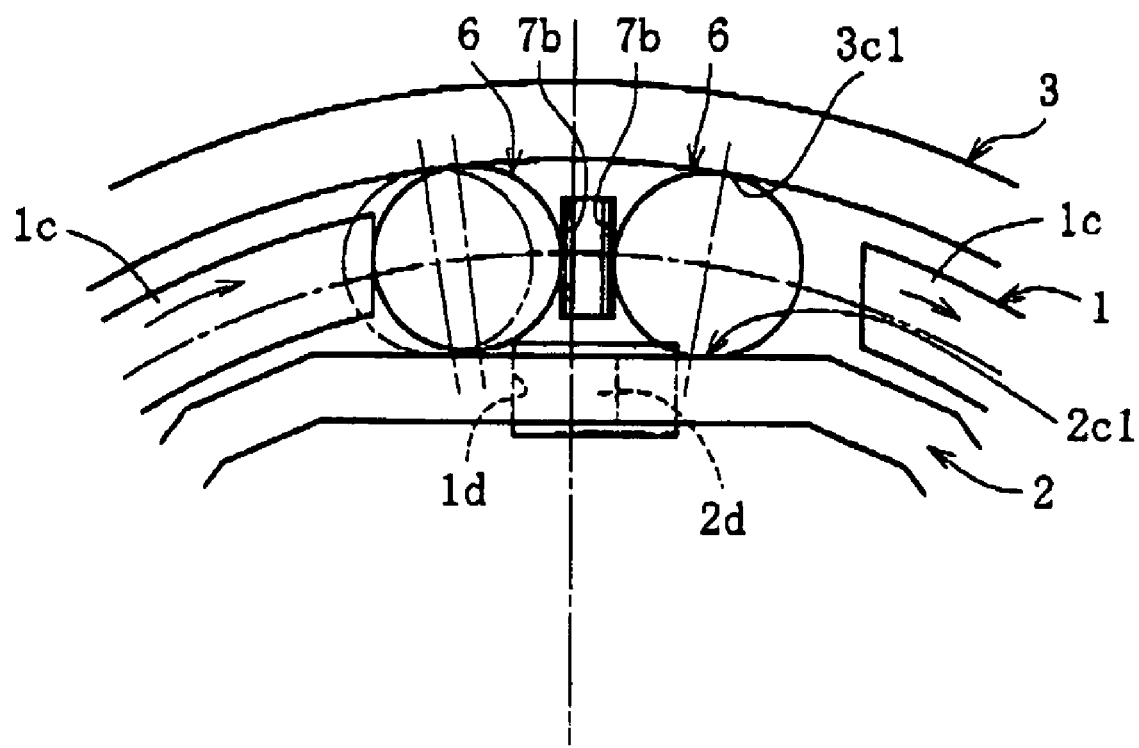
FIG. 9 is a partially enlarged transverse sectional view describing the operation of the reverse input blocking clutch according to the first embodiment (during torque transmission)

If the input member 1 rotates further in the clockwise direction, then as shown in FIG. 9, the surface wall of the aperture 1d of the input member 1 engages with the protrusion 2d of the output member 2 in a clockwise direction. As a result, the clockwise input torque from the input member 1 is transmitted to the output member 2 via this engagement between the aperture 1d and the protrusion 2d, and the output member 2 begins to rotate in a clockwise direction. In the case in which a counter clockwise input torque is input at the input member 1, then the opposite operation to that described above results in the output member 2 rotating in a counter clockwise direction. Accordingly, input torque from the input member 1 in either the forward or the reverse rotational direction is transmitted to the output member 2 via the torque transmission means comprising the apertures 1d and the protrusions 2d, and results in the output member 2 rotating in either the forward or the reverse rotational direction. Moreover, when the input torque from the input member 1 disappears, the rollers 6 and the input member 1 return to the respective neutral positions shown in FIG. 7 under the effect of the elastic restoring force of the tongue sections 7b.

Figure 11:
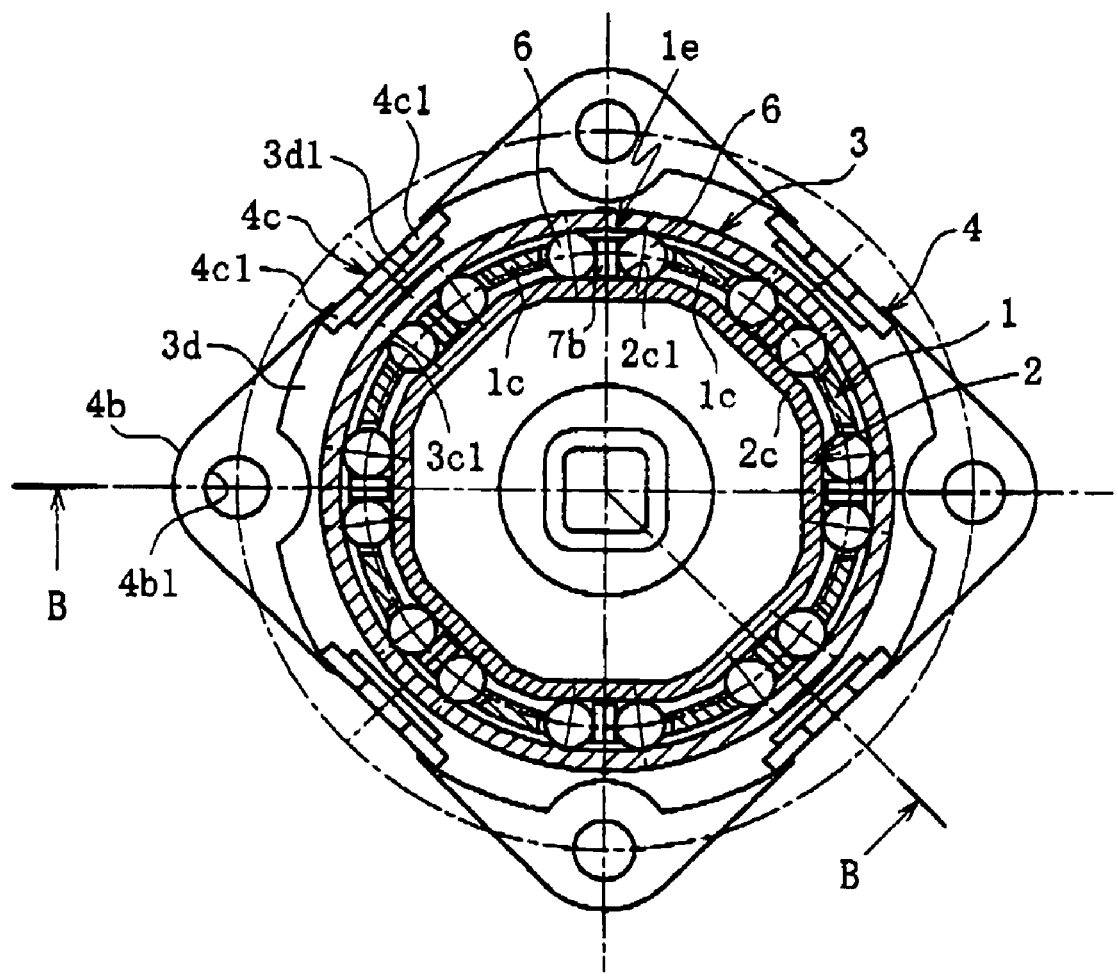
FIG. 11 is a transverse sectional view (a cross-sectional view taken along the line A—A of FIG. 10a) showing the reverse input blocking clutch according to the second embodiment.
Figure 12:
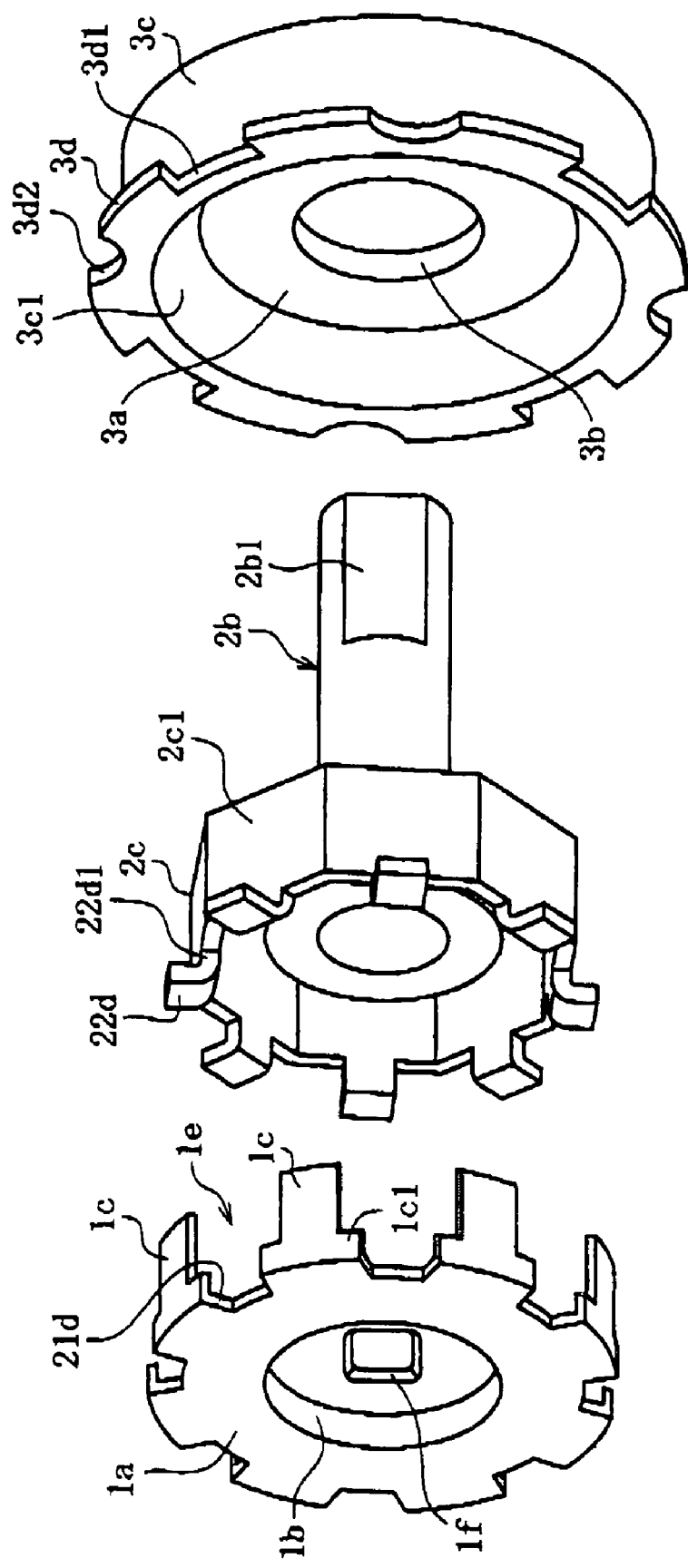
FIG. 12 is a perspective view of an input member, an output member and a stationary member.

FIG. 10 to FIG. 12 show a second embodiment of the present invention. This second embodiment differs from the first embodiment described above in that the torque transmission means employs an engagement structure comprising notches 21*d* and protrusions 22*d* which project radially outward. As shown in FIG. 12, the notches 21*d* are formed in the outer edge of the flange section 1*a* of the input member 1. A plurality (eight for example) of notches 21*d* are formed, and these are arranged with equidistance around the periphery of the flange section 1*a*. The base ends 1*c*1 of the pillars 1*c* are slightly wider in a circumferential direction than the tips, and the notches 21*d* are positioned between each set of adjacent base ends 1*c*1. The radially outward projecting protrusions 22*d* are formed as a continuation of the large diameter section 2*c* of the output member 2, linked by axial direction base ends 22*d*1. A plurality (eight for example) of protrusions 22*d* are formed, and these are arranged with equidistance around the periphery of the large diameter section 2*c*. Each of the protrusions 22*d* of the output member 2 fits into one of the notches 21*d*, with a gap $\delta 2$ in the direction of rotation (refer to FIG. 7).

Figure 13:
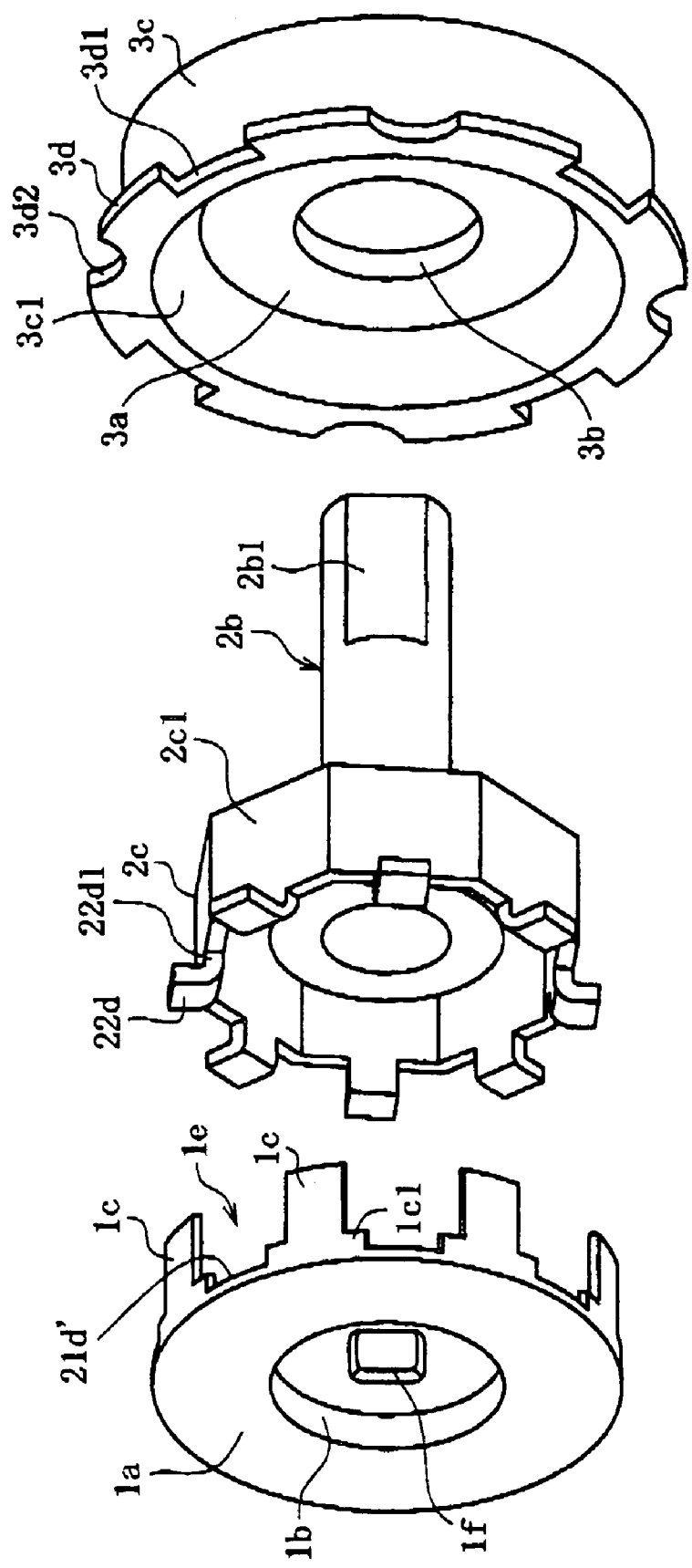
FIG. 13 is a perspective view of an input member, an output member and a stationary member according to another example.

Moreover, instead of the notches 21*d*, the input member 1 may also be provided with notches 21*d'* of the shape shown in FIG. 13. According to this example, unlike the notch shape shown in FIG. 12, the flange section 1*a* of the input member 1 need not be subject to notching, and consequently the production process is simpler. Furthermore, the torque transmission means could also be achieved by fitting together the notches provided in the input member 1 and axial protrusions provided on the output member 2, with a gap $\delta 2$ in the direction of rotation (refer to FIG. 7). The remaining details of the construction of the embodiment are identical with those described for the first embodiment, and as such are omitted here.

According to the present invention, a reverse input blocking clutch can be provided which incorporates a function for transmitting input torque from the input side to the output side while locking reverse input torque from the output side and preventing such reverse torque returning to the input side, and which is moreover compact, lightweight, and cheap to produce.

Figure 14:
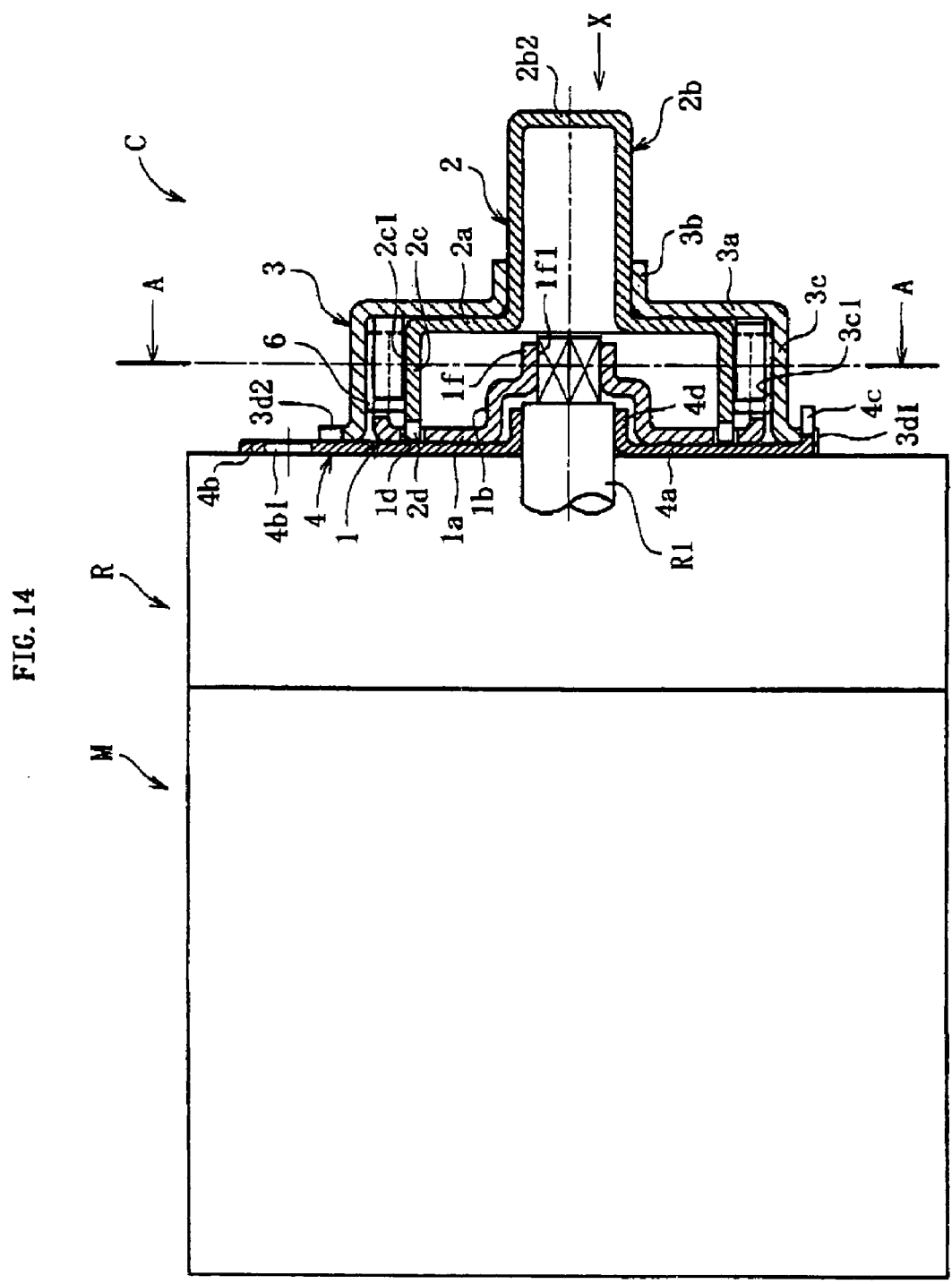
FIG. 14 is a longitudinal sectional view (a cross-sectional view taken along the line B—B of FIG. 15) or a clutch device.
Figure 15:
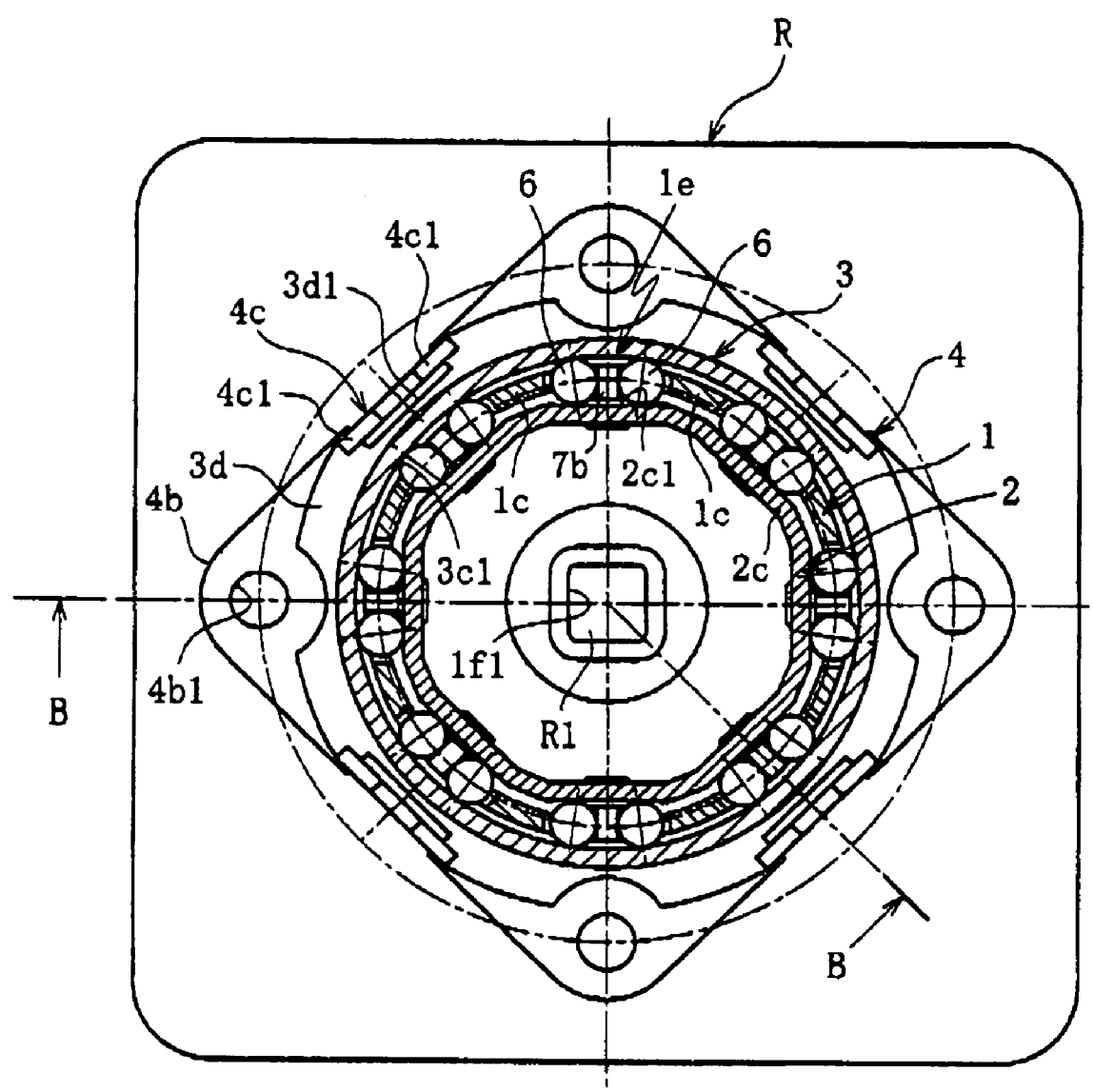
FIG. 15 is a transverse sectional view (a cross-sectional view taken along the line A—A of FIG. 14) showing the above clutch device.

FIG. 14 and FIG. 15 show the overall structure of a clutch device which employs a reverse input blocking clutch C (lock type) as described above. This clutch device is assembled into a single unit comprising a motor M, a reduction gear R, and the reverse input blocking clutch C. This clutch device functions as a rotational driving device for generating rotational torque, and torque generated by the motor M is decelerated by the reduction gear R, and is subsequently transmitted from an output shaft R1 of the reduction gear R, through the reverse input blocking clutch C, and input into an output side mechanism O (refer to FIG. 17 and FIG. 18). In terms of the vehicle mirror driving device mentioned above, the mirror to be driven (such as a door mirror) would correspond with the output side mechanism O.

The reverse input blocking clutch C comprises, as main elements, an input member 1 into which torque from the reduction gear R is input, an output member 2 to which torque is output, a stationary member 3 for constraining the revolutions, a fixed side plate 4 fixed to the stationary member 3, and locking means, lock release means and torque transmission means which are described below.

The output shaft R1 of the reduction gear R is inserted into a connector 1*f* of the input member 1. The outer periphery of the tip of the output shaft R1 is a polygonal shape, such as a square shape, which corresponds with the internal surface of the connector 1*f*, and each side of the square forms one of four flat surfaces. Engagement between each of the flat surfaces formed on the output shaft R1 with the corresponding flat surfaces 1*f*1 of the connector 1*f* causes the output shaft R1 and the input member 1 to be connected in such a manner that prevents relative rotation.

An output shaft section 2*b* of the output member 2 is connected to the driven member (not shown in the drawings) of the output side mechanism O. In this embodiment, the example is shown in which the end section of the output shaft section 2*b* is a circular cylindrical surface, although either one, or a plurality of flat surfaces 2*b*1 can also be formed on this end section, in the same manner as was shown in the first embodiment. By attaching installation bolts inserted in the through holes 4*b*1 of the fixed side plate 4, to a member (a frame or housing) of the reduction gear R, the reverse input blocking clutch C can be fixed directly to the reduction gear R. The device for fixing the reverse input blocking clutch C to the reduction gear R is not restricted to bolts however, and any other suitable device can also be selected. Moreover, the reverse input blocking clutch C can also be fixed to a commercially available reduction gear motor in which the motor M and the reduction gear R have already been assembled.

The remaining construction and the operation of the reverse input blocking clutch C are identical with the embodiments described in FIG. 1 through FIG. 13, and as such are not described here.

Figure 16:
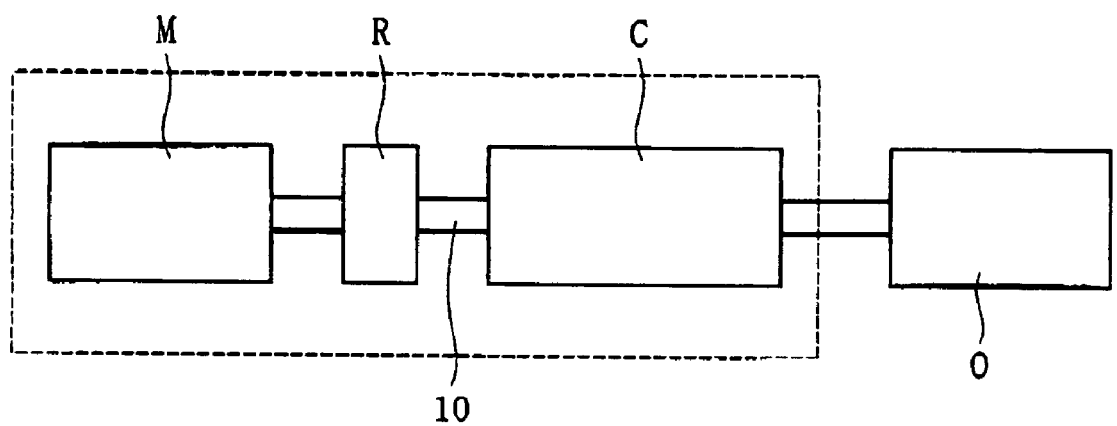
FIG. 16 is a schematic illustration showing a rotational driving system comprising a motor, a reduction gear, a reverse input blocking clutch, and an output mechanism.
Figure 17:
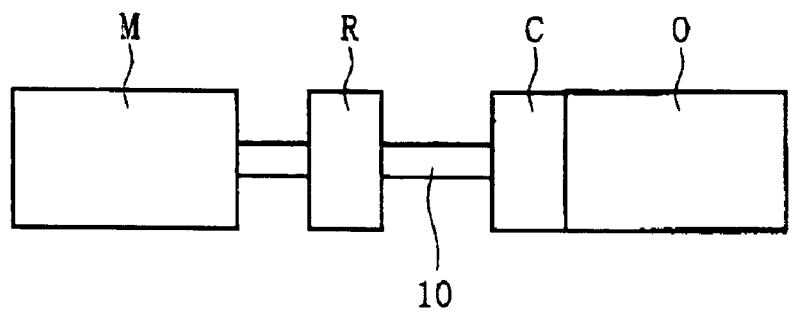
FIG. 17 is a schematic illustration showing a rotational driving system comprising a motor, a reduction gear, a reverse input blocking clutch, and an output mechanism.

In the above description, and as is also shown in FIG. 16, the example was described wherein the motor M, the reduction gear R and the reverse input blocking clutch C of the rotational driving system for driving the output side mechanism O with the rotational torque from the motor M were incorporated within a single unit (the unit is shown with a dotted line in the figure). However, as shown in FIG. 17, a clutch device which operates on receiving rotational torque can also be constructed by separating the reverse input blocking clutch C from the reduction gear R and integrating the clutch into a unit with the output side mechanism O. In such a case, the construction of the reverse input blocking clutch C conforms with the construction of the clutch device described in FIG. 1 through FIG. 15. In such a case, the connector 1*f* of the input member 1 is connected to a transmission shaft 10 which extends out from the output side of the reduction gear R, and the output shaft section 2*b* of the output member 2 is connected to the input side (the driven member) of the output side mechanism O.

The reverse input blocking clutch described above is not restricted to use in only vehicle mirror driving devices, and can also be used in a wide variety of other mechanisms and devices. Other examples include folding devices (such as a bed, a seat or the joints of a robot) which generate an angular displacement, raising and lowering devices (such as an elevator, a jack, or the window glass in a vehicle) which generate a linear displacement, opening and closing devices (such as a door, a shutter, a sunroof, or an electric sliding door), and rotational devices (such as an electric power steering device, a bicycle sprocket, an electric wheelchair, an electric vehicle, and the rear wheels of a vehicle with four wheel steering [which uses a ball screw]). Specifically, in the feed screw section of a machine tool or control device, or in the ball screw section of a nursing bed or a home elevator driven by a ball screw, by positioning a reverse input blocking clutch C between the screw section and the motor, the output member 2 can be locked with respect to reverse input torque from the screw section (which corresponds with the driven member or the output side mechanism O), thereby preventing reverse input torque returning to the motor side of the device.

Furthermore, in tools such as electric drivers and the like, if a reverse input blocking clutch C described above is positioned between the motor and the chuck, then the output member can be locked with respect to reverse input torque applied by the chuck, and so having screwed in a screw electrically, the screw can be further tightened by hand (by rotating the entire tool), thereby increasing the functionality of the tool.

Furthermore, in the case of power seats or power windows in vehicles, a reverse input blocking clutch C such as that described above can also be positioned between the motor and the seat (or the window). In such mechanisms, a worm and wheel mechanism is often used as a reduction gear for preventing the return of reverse input torque from the seat or the window to the motor, although because the torque transmission efficiency of a worm and wheel mechanism is quite poor, the capacity of the motor needs to be increased. In contrast, if a reverse input blocking clutch is used, then return of reverse input torque from the seat or the like can be prevented in a similar manner, and so a spur gear or the like, with a better transmission efficiency than a worm and wheel mechanism, can be used, meaning the capacity of the motor can be minimized.

Furthermore, a reverse input blocking clutch as described above can also be installed in the rotational drive section of the C arm of an X-ray inspection device. The C arm is a C shaped member with an X-ray irradiation section and a receiver section, and during inspection this C arm is rotated around the object being inspected so that imaging can be conducted from any position. By positioning a reverse input blocking clutch C as described above between this C arm and the motor, fluctuations of the C arm can be suppressed, enabling more precise imaging to be conducted.

Furthermore, in vehicles such as motorbikes, buggies and tractors, kick back from the surface of the road during traveling transfers to the handles or steering wheel. In such cases, if a reverse input blocking clutch C described above is positioned between the steering shaft and the axle shaft, then kick back can be suppressed, enabling an improvement in steering stability.

According to the present invention, because the rotational driving source comprising the motor and the reduction gear, and the clutch (or the clutch and the output mechanism) are produced as a single integrated unit, a compact and lightweight clutch device can be provided. This clutch device incorporates a function for transmitting input torque from the input side to the output side while locking reverse input torque from the output side and preventing such reverse torque returning to the input side, and consequently reverse input torque does not generate any rotation within the rotational driving source. Accordingly, deleterious effects on the reduction gear and the motor resulting from excessive reverse input torque can be prevented, making the invention suitable for applications in which positional displacement of the output mechanism resulting from reverse input torque is undesirable.

Next is a description of a clutch device using a free type clutch for blocking the return of reverse input torque to the input side by allowing the output member to freely rotate with respect to such reverse input torque.

Figure 18:
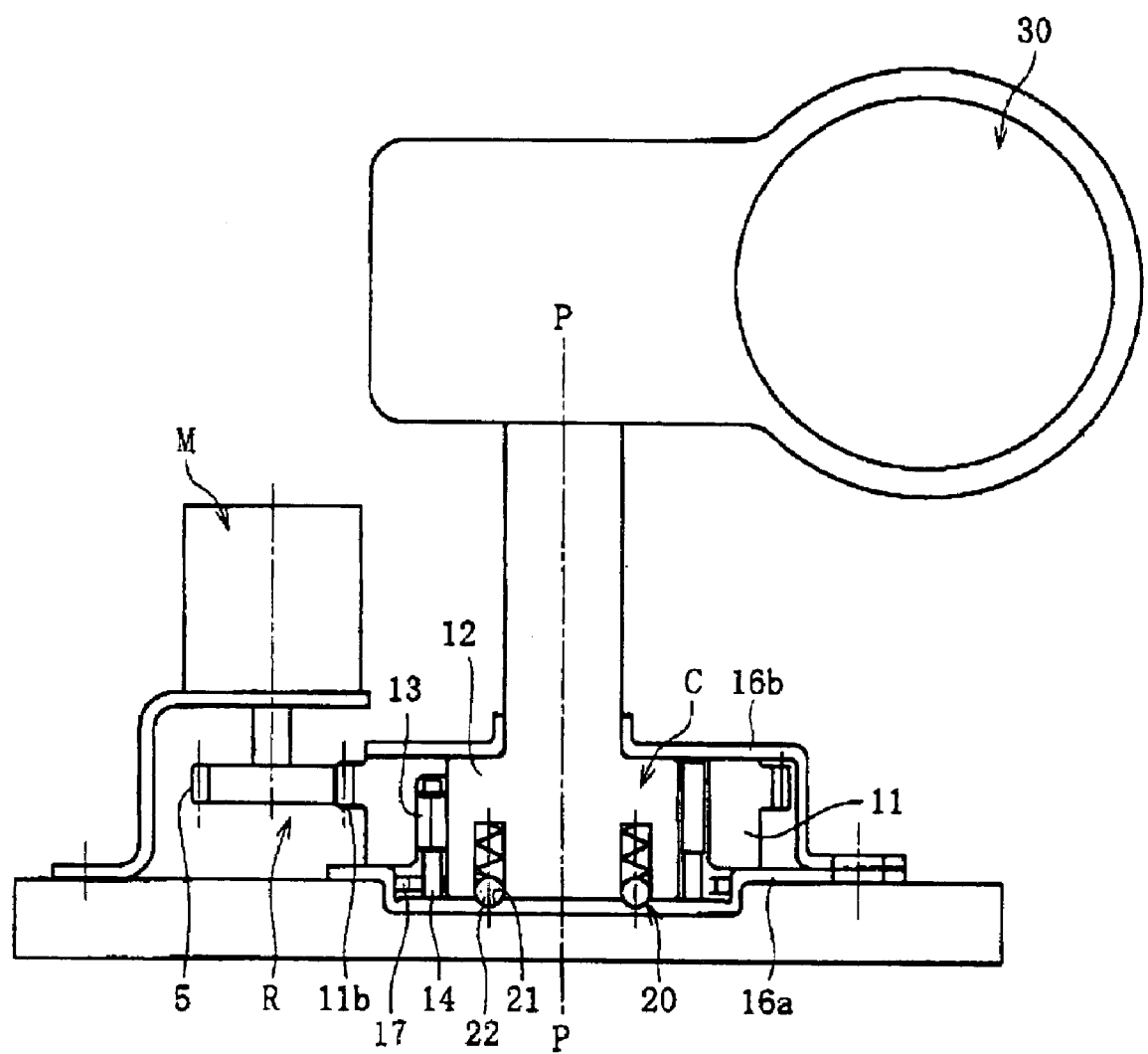
FIG. 18 is a cross-sectional view of a clutch device.

FIG. 18 shows one embodiment of this type of clutch device. As shown in the figure, this clutch device comprises a reverse input blocking clutch C, restraining means 20, and a motor M which functions as a rotational driving source. Rotational torque from the motor M is transmitted via the reverse input blocking clutch C to a mirror 30 which functions as the driven member, and this mirror is able to be swung in both the forward and reverse directions about a swing axis P. The restraining means 20 holds the mirror 30 at a predetermined storage position and a working position.

Figure 19:
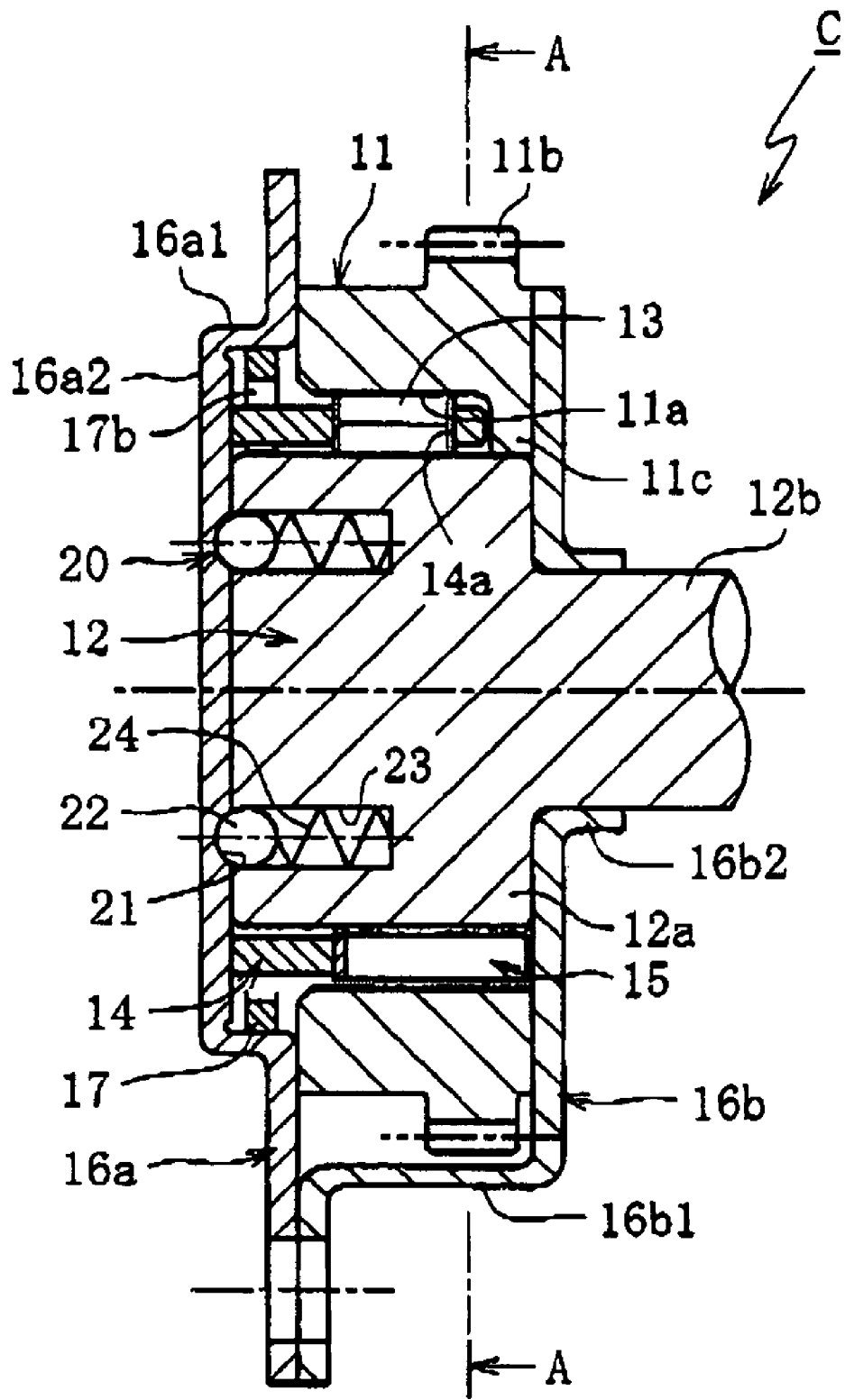
FIG. 19 is a cross-sectional view of a clutch device, and represents a cross-section taken along the line B—B in FIG. 20.
Figure 20:
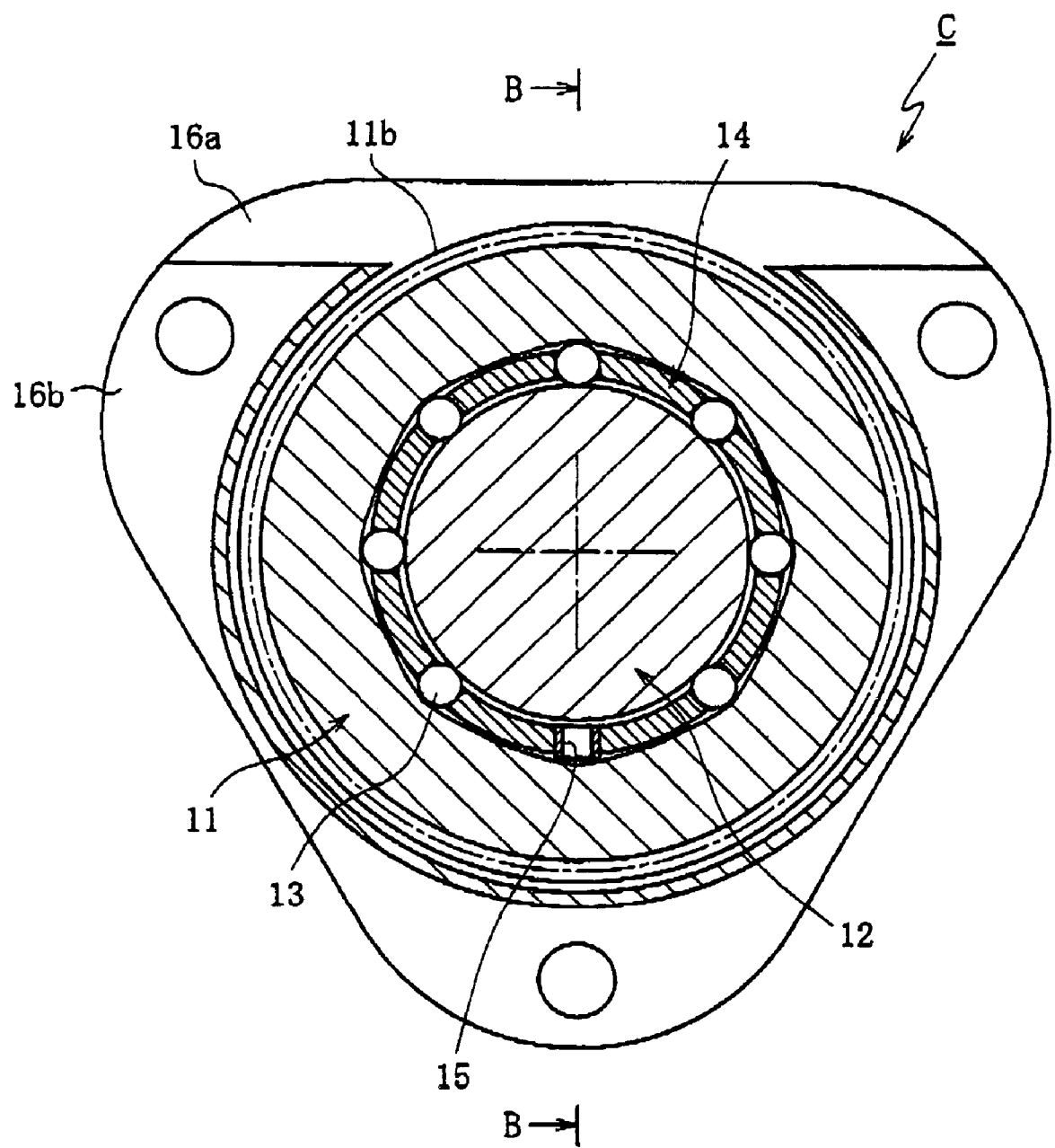
FIG. 20 is a cross-sectional view of a clutch device, and represents a cross-section taken along the line A—A in FIG. 19.

As shown in FIG. 19 and FIG. 20, the reverse input blocking clutch C comprises an input outer ring 11 which functions as an input member, an output inner ring 12 which functions as an output member, rollers 13 which function as torque transmission means, a retainer 14 for retaining the rollers 13, a centering spring 15 which functions as a first elastic member for positioning the retainer 14, first and second side plates 16a, 16b which function as a stationary member, and a sliding spring 17 which functions as rotational resistance application means for applying sliding frictional resistance to the retainer with respect to rotation of the retainer 14. Input torque from the motor M is input at the input outer ring 11, and is transmitted through the rollers 13 and output from the output inner ring 12. As is shown in FIG. 18, the rotational shaft of the mirror 30 is connected to the output inner ring 12.

In the following description, for the sake of convenience, the right side of the FIG. 19 is referred to as "one edge" or "one side", and the left side of the figure is referred to as the "other edge" or the "other side".

A toothed section 11b is formed at the outer periphery of one edge of the input outer ring 11. As shown in FIG. 18, this toothed section 11b meshes with a driving gear 5 attached to the output shaft of the motor M to form the reduction gear R. The reduction gear R is not restricted to the configuration shown in the figure, and may adopt any suitable configuration. The toothed section 11b may be formed directly on the outer periphery of the input outer ring 11 using a metallic material such as hardened steel, or may also be formed as a separate member which is subsequently fixed to the outside of the input outer ring 11. In such a case, the toothed section 11b could be made of a resin and the input outer ring 11 manufactured from a metallic material such as hardened steel, with the two components then being integrated into a single unit using pressure, an engagement between mating ribbed surfaces, or insert molding.

Figure 21:
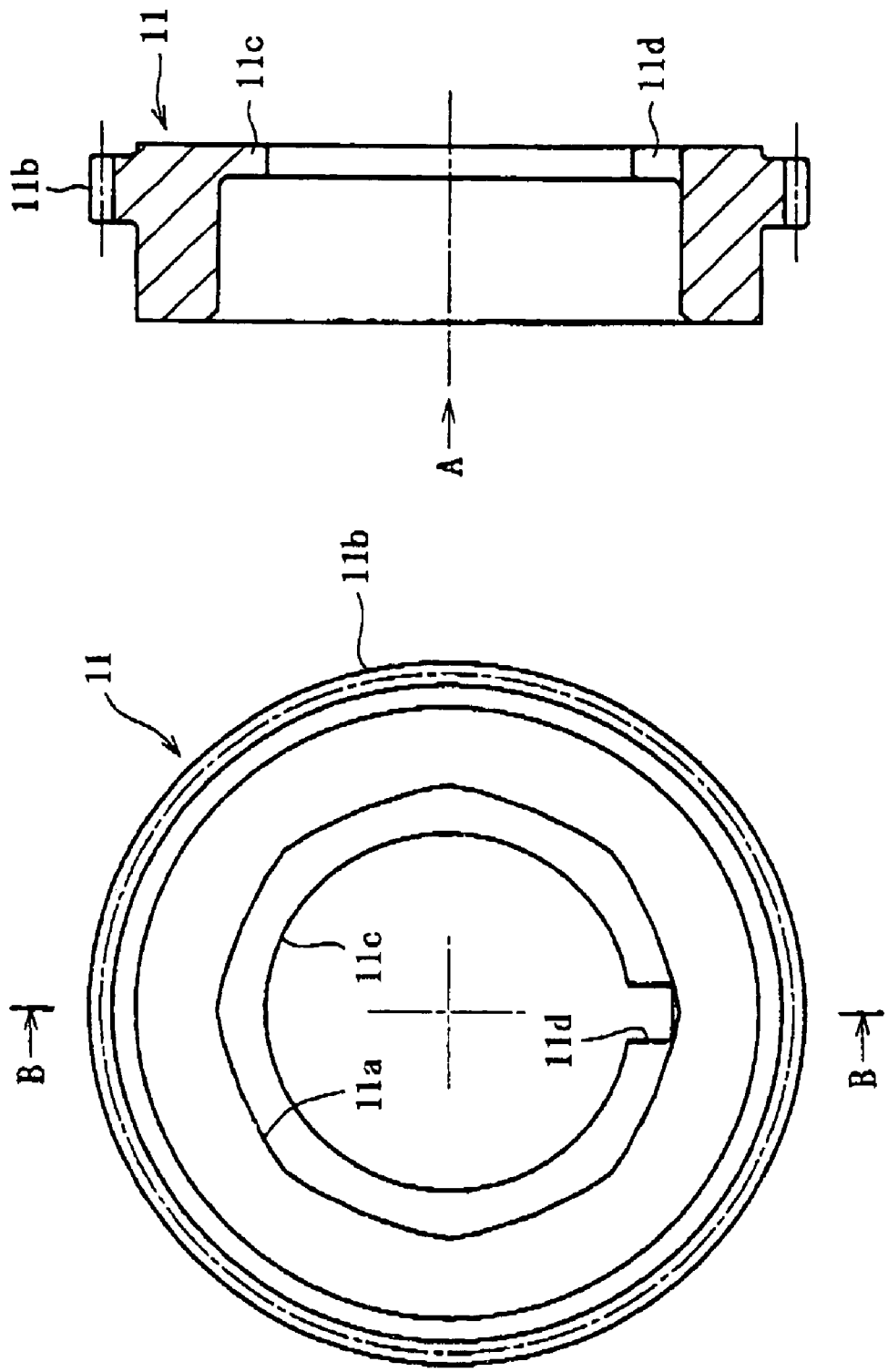

As shown in FIG. 21, a collar 11c which protrudes radially inward is formed on one edge of the inner perimeter of the input outer ring 11. At one position in the circumference of this collar 11c, a notch 11d is formed which extends the entire length of the collar 11c in an axial direction.

As shown in FIG. 19 and FIG. 20, the output inner ring 12 is positioned inside the input outer ring 11. This output inner ring 12 comprises a cylindrical section 12a facing the inner surface of the input outer ring 11, and a shaft section 12b which extends out in an axial direction. In this embodiment, the outer periphery of the cylindrical section 12a is formed in a circular cylindrical shape.

Figure 22:
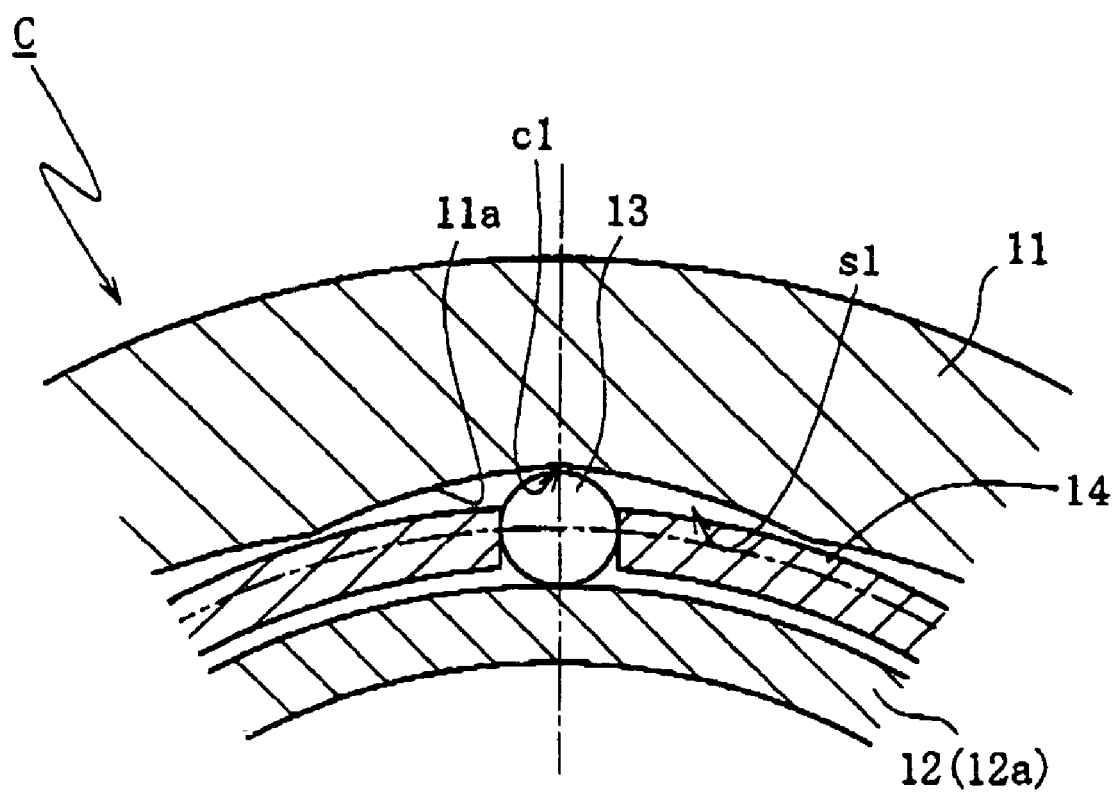
FIG. 22 is a partially enlarged cross-sectional view showing the operation (neutral state) of a reverse input blocking clutch.
Figure 23C:
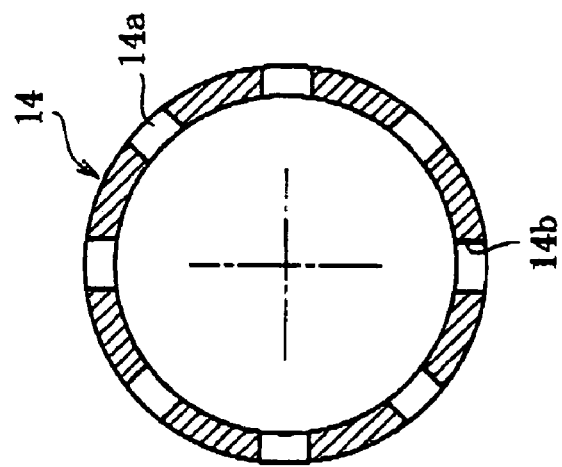
Figure 23B:
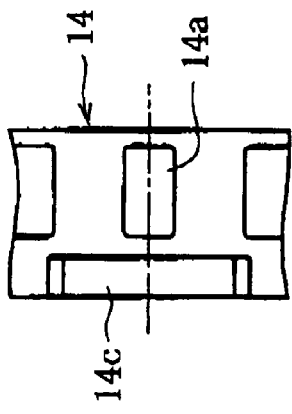
FIG. 23b is a front view of the same.
Figure 23A:
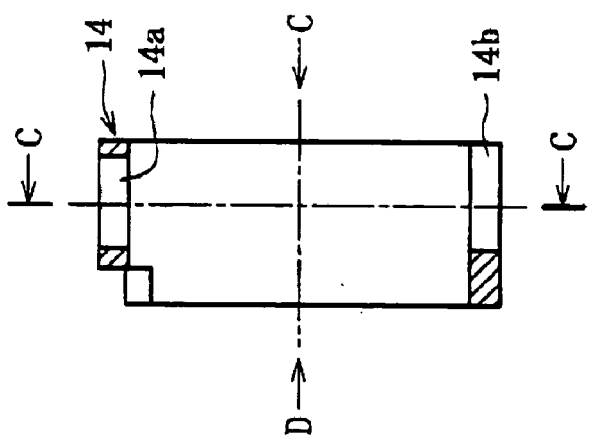
FIG. 23a is a cross-sectional view of a retainer.
Figure 23D:
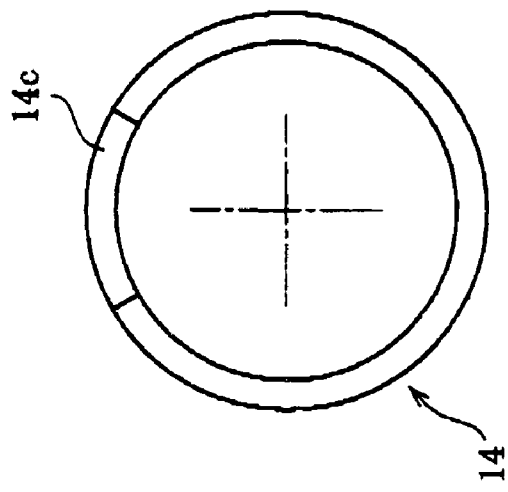

As shown in FIG. 22, the inner surface of the input outer ring 11 is provided with a plurality (the same number as the number of rollers 13) of cam surfaces 11a, which are formed with equidistance around the periphery, and which together with the outer surface of the cylindrical section 12a of the-output inner ring 12 form wedge shaped gaps s1 which reduce in width symmetrically in both the forward and reverse rotational directions. Each wedge shaped gap s1 has a width at the center point thereof in a circumferential direction c1 which is larger than the diameter of the roller 13, and the wedge shaped gap s1 reduces in width symmetrically in both the forward and reverse rotational directions from this circumferential center point c1. When the roller 13 is positioned at the circumferential center point c1 of the wedge shaped gap s1, the roller 13 is able to rotate freely within the wedge shaped gap s1.

The retainer 14 is a circular cylinder, and is positioned between the inner surface of the input outer ring 11 and the outer surface of the cylindrical section 12a of the output inner ring 12, with the rollers 13 retained in a plurality of pockets 14a formed with equidistance around the periphery of the retainer 14. As shown in FIG. 23, an axial direction notch 14b for accommodating the centering spring 15 is formed in the axial end surface on one side of the retainer 14, and a notch 14c which extends in a circumferential direction is formed in the axial end surface on the other side. In the example shown in the figures, the notches 14b, 14c are positioned 180° apart in radially opposing positions. The other axial end surface of the retainer 14 protrudes further than the other end surface of the input outer ring 11, and the notch 14c extending in a circumferential direction is formed in this protruding section.

Figure 24A:
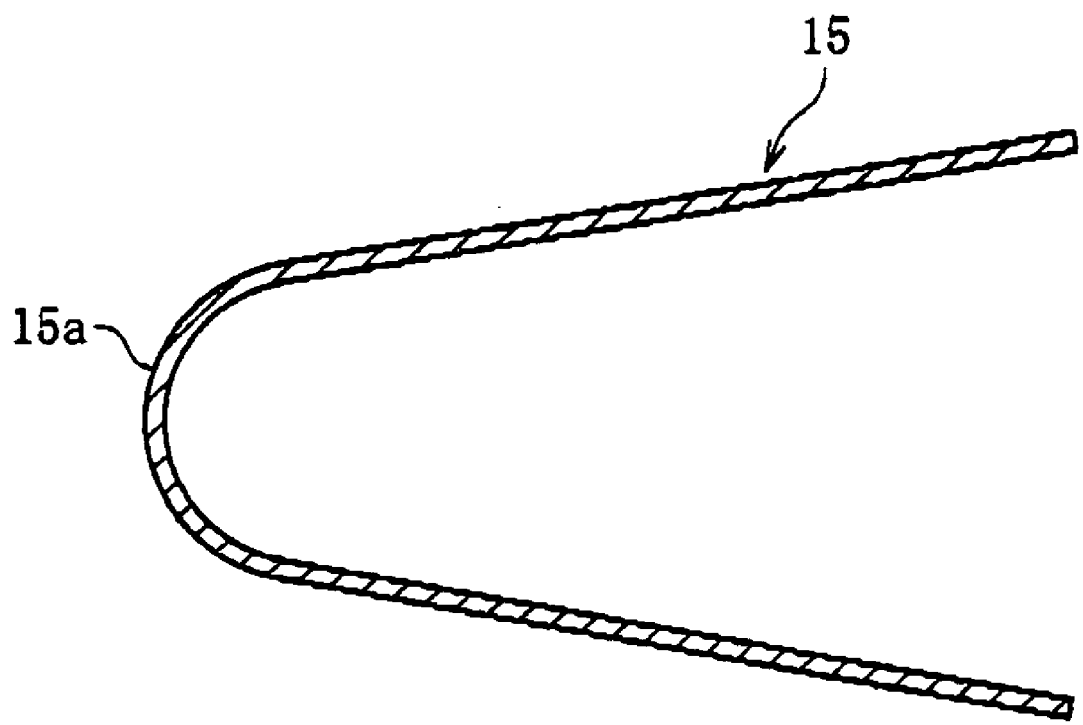
FIG. 24a is a cross-sectional view of a centering spring.
Figure 24B:
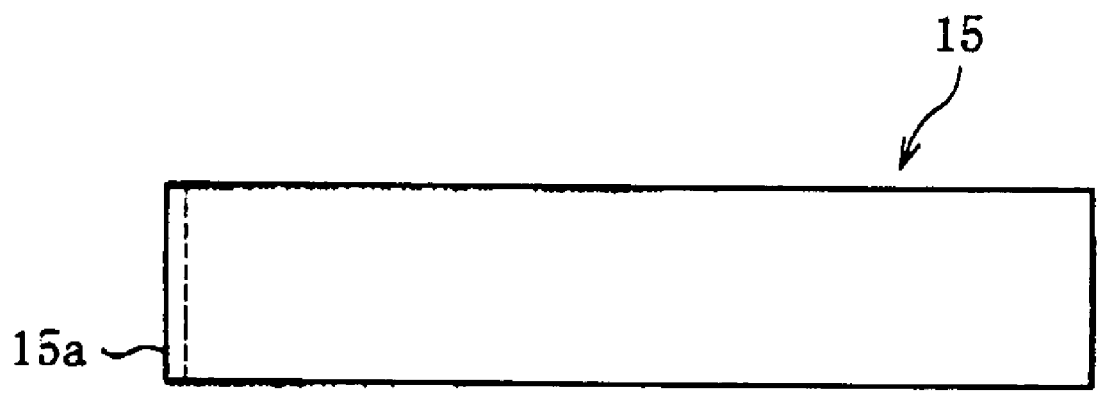
FIG. 24b is a plan view of the same.

As shown in FIG. 24, the centering spring 15 is constructed from a plate spring which is bent to a substantially U shape. As can be seen in FIG. 19 and FIG. 20, once the positions of the notch 11d in the input outer ring 11 and the notch 14b in the retainer 14 have been aligned in a circumferential direction, this centering spring 15 is engaged into both these notches lid, 14b, with the two tips of the U shape able to expand and contract in a circumferential direction, and with the bottom 15a of the U shape facing inward. This centering spring 15 performs the function of elastically connecting the retainer 14 and the input outer ring 11 in a rotational direction, and also performs the function of positioning (centering) the retainer 14 with respect to the input outer ring 11 so that the rollers 13 accommodated within the pockets 14a of the retainer 14 are positioned at the respective circumferential center points c1 of the wedge shaped gaps s1. FIG. 22 shows the state in which the retainer 14 has been centered by the centering spring 15, and in this state, the circumferential centers of the pockets 14a of the retainer 14 coincide with the circumferential center positions of the cam surfaces 11a of the input outer ring 11, and the roller 13 are positioned at the respective circumferential center points c1 of the wedge shaped gaps s1.

The first side plate 16a and the second side plate 16b are members of the stationary system (the member which does not rotate), and are formed from either press worked metal plate or molded resin. As shown in FIG. 19, these two side plates 16a, 16b are fastened together as a single unit using bolts or the like, with-the structural elements of the clutch (the input outer ring 11, the output inner ring 12, the rollers 13; the retainer 14, the centering spring 15 and the sliding spring 17) housed between the two plates.

The first side plate 16a comprises a cylindrical section 16a1 for housing the other end of the retainer 14 and the sliding spring 17, and a support section 16a2 which extends radially inward from the other edge of the cylindrical section 16a1. The support section 16a2 faces the edge surface of the cylindrical section 12a of the output inner ring 12 in an axial direction, and the inner surface of the support section 16a2 is pressed against the edge surface of the cylindrical section 12a. The second side plate 16b comprises a cylindrical section 16b1 for housing the input outer ring 11, and a support section 16b2 positioned inside the cylindrical section 16b1. The shaft section 12b of the output inner ring 12 is inserted inside the support section 16b2, and this support section 16b2 functions as a bearing (a sliding bearing) for supporting the shaft section 12b in such a manner that allows free rotation in a radial direction. A portion of the cylindrical section 16b1 of the second side plate 16b is cut away, and within this cut away portion, the toothed section 11b of the input outer ring 11 meshes with the driving gear 5 shown in FIG. 18.

Figure 25:
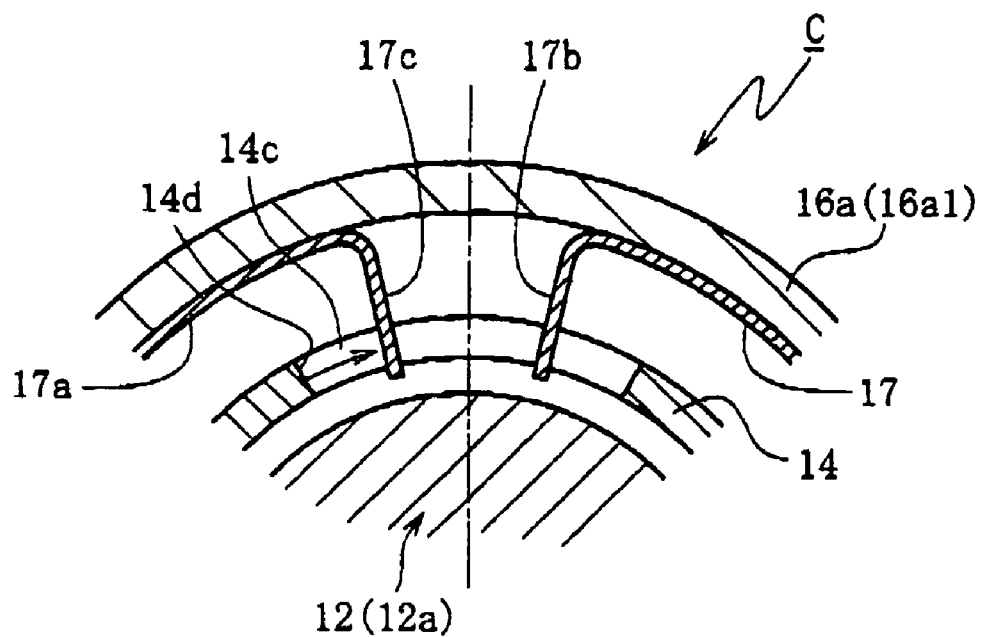
FIG. 25 is a partially enlarged cross-sectional view showing the operation (sliding spring) of a reverse input blocking clutch.

The sliding spring 17 is a sliding member which slides relative to the first side plate 16a, and in this particular embodiment is formed as an open ring shaped spring member. As can be seen in FIG. 25, this sliding spring 17 comprises a ring shaped sliding section 17a, and engagement sections 17b, 17c formed by bending the two tips of the sliding section 17a radially inwards. The sliding section 17a is squeezed slightly closed and pushed inside the inner perimeter of the of the cylindrical section 16a1 of the first side plate 16a, and is held in elastic contact with the inner surface of the cylindrical section 16a1. The engagement sections 17b, 17c are both inserted into the notch 14c extending in a circumferential direction around the other edge of the retainer 14, and in this state, the distance between the engagement sections 17b, 17c in a circumferential direction is smaller than the circumferential length of the notch 14c.

As follows is a description of the operation of the reverse input blocking clutch C.

In the initial state prior to the input of rotational torque at the input outer ring 11, the retainer 14 is centered by the centering spring 15 as shown in FIG. 22. Consequently, the rollers 13 accommodated within the pockets 14a of the retainer 14 are positioned at the circumferential center points c1 of the wedge shaped gaps s1 formed between the cam surfaces 11a of the input outer ring 11 and the cylindrical section 12a of the output inner ring 12.

If a rotational torque in a clockwise direction as shown in the figures is input from the motor M to the input outer ring 11, then the centering spring 15 causes the retainer 14 attached to the input outer ring 11 to begin rotation together with the input outer ring 11. Then, when the retainer 14 has rotated through a predetermined angle, the rear edge surface 14d relative to the rotational direction, defining the notch 14c of the retainer 14 contacts the rear engagement member 17c of the sliding spring 17 relative to the rotational direction, as shown in FIG. 25.

If the input outer ring 11 then rotates even further, the edge surface 14d of the retainer 14 engages with the engagement member 17c of the sliding spring 17 and causes the sliding spring 17 to also rotate. At this point, the sliding spring 17 slides around the inner perimeter of the cylindrical section 16a1 of the first side plate 16a and is subjected to sliding frictional resistance from the stationary side. This sliding frictional resistance is transmitted to the retainer 14 via the engagement member 17c, and acts as resistance to the rotation of the retainer 14. Provided the rotational resistance (torque) on the retainer 14 resulting from the sliding frictional resistance of the sliding spring 17 is set to a greater value than the elasticity (spring torque) of the centering spring 15, then the centering spring 15 undergoes an elastic deformation, and the retainer 14 develops a rotational lag relative to the input outer ring 11 equivalent to the amount of elastic deformation.

Figure 26:
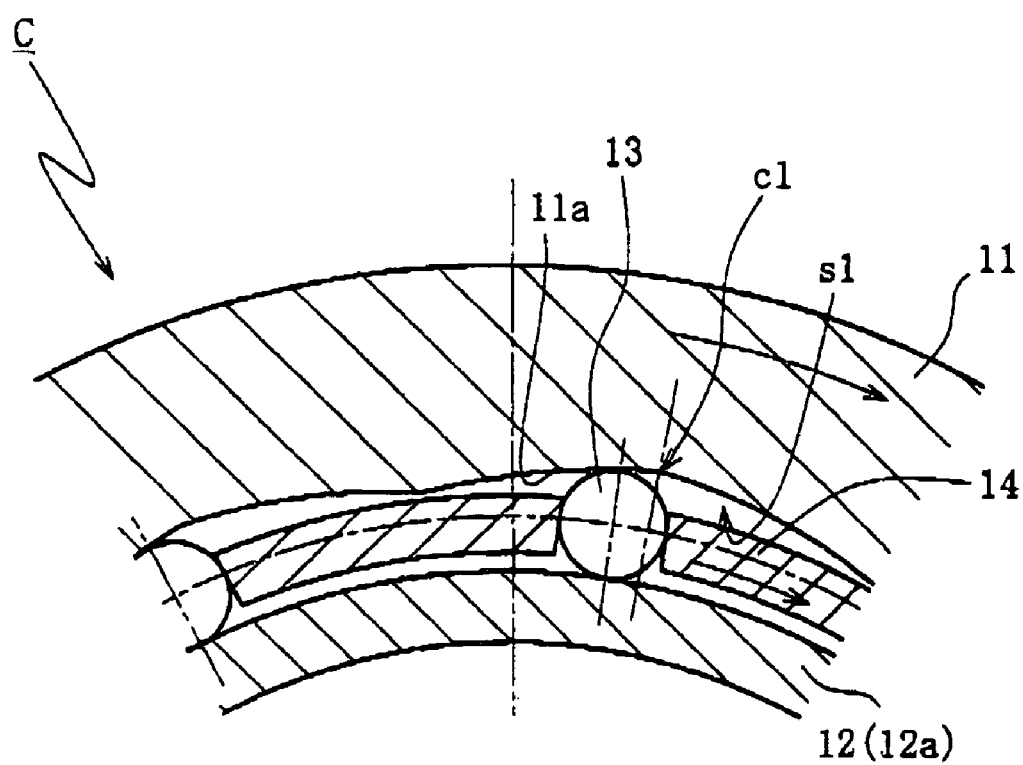
FIG. 26 is a partially enlarged cross-sectional view showing the operation (torque transmission state) of a reverse input blocking clutch.

As a result of this rotational lag of the retainer 14, the roller 13 held within the pocket 14a becomes wedged in the wedge shaped gap s1 between the cam surface 11a of the input outer ring 11 and the outer surface of the cylindrical section 12a of the output inner ring 12, as shown in FIG. 26. Consequently, the rotational torque input at the input outer ring 11 is transmitted to the output inner ring 12 via the roller 13. In the case in which a rotational torque in a counter clockwise direction is input to the input outer ring 11, the reverse operations to those described above result in the output inner ring 12 rotating in a counter clockwise direction.

When the input outer ring 11 stops, the restoring force of the centering spring 15 causes the roller 13 to disengage from the wedge shaped gap s1 and return to the circumferential center point c1 of the wedge shaped gap s1. In those cases in which the engagement force (the residual torque) acting upon the roller 13 is large, so that the roller 13 stays wedged within the wedge shaped gap s1 even after the input outer ring 11 has stopped, the roller 13 can be disengaged from the wedge shaped gap s1 by applying a rotational torque in a counter clockwise direction (the opposite direction to the input rotational torque) to the input outer ring 11.

In contrast, in the case in which a reverse input torque is applied to the output inner ring 12 from the mirror 30, the sliding frictional resistance of the sliding spring 17 is not produced, and so the retainer 14 is held in a centered state (refer to FIG. 22) by the centering spring 15. In this centered state, because the roller 13 is positioned in the circumferential center of the wedge shaped gap s1, the roller 13 is able to rotate freely. As described above, this enables the output inner ring 12 to slip freely, thereby blocking the transmission of the reverse input torque to the input side.

The restraining means 20 is a device for holding the mirror 30 in a storage position or a working position, by causing an elastic engagement between a concave engagement member 21 provided on either one of the stationary member and the output inner ring 12, and a convex engagement member 22 provided on the other member.

Figure 27A:
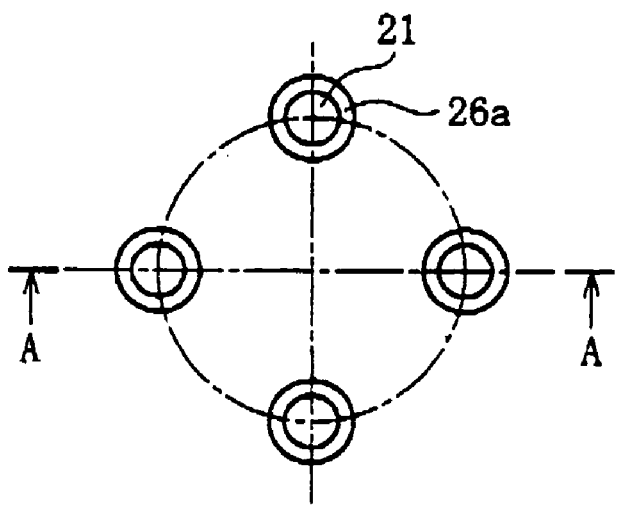
FIG. 27a is a plan view showing an embodiment of a concave engagement section.

In FIG. 19, the example is shown in which concave engagement members 21 are formed on the support section 16a2 of the first side plate 16a which functions as the stationary member, and convex engagement members 22 are formed on the opposing cylindrical section 12a of the output inner ring 12. Each concave engagement member 21 is formed by, for example, creating a depression in the inner surface of the support section 16a2 of the first side plate 16a, and these depressions are formed in four positions spaced at equal 90° intervals in a circumferential direction (refer to FIG. 27a). Each convex engagement member 22 is formed from a steel ball, for example, which is housed within an axial direction aperture 23 formed in the end surface of the cylindrical section 12a of the output inner ring 12, and retained in place by a second elastic member 24 comprising a coiled spring or the like. In this embodiment, convex engagement members 22 are provided at four positions spaced at equal 90° intervals in a circumferential direction, in the same manner as the concave engagement members 21. The convex engagement members 22 are permanently pressed against the surface of the support section 16a2 by the elastic force of the elastic members 24, and each of the concave engagement members 21 is positioned at a point within the rotational locus of a convex engagement member 22. Consequently, each convex engagement member 22 either slides or rolls across the inner surface of the support section 16a2 as the output inner ring 12 rotates, and upon reaching a concave engagement member 21, projects outward and engages elastically with that concave engagement member 21.

In the above construction, when the mirror 30 is either opened from the storage position to the working position, or closed from the working position back to the storage position, then at the point where the mirror 30 has undergone a rotation of approximately 90°, the concave engagement members 21 and the convex engagement members 22 engage elastically, retaining the mirror 30 at one of the respective positions. Because the aforementioned reverse input blocking clutch C which enables the output inner ring 12 to slip freely with respect to a reverse input torque is connected to the mirror 30, there is a danger that vehicle vibrations or wind pressure during operation of the vehicle may cause the mirror 30 to rotate, producing a positional displacement. However, because a clutch device according to the present invention is also provided with the aforementioned restraining means 20, the mirror 30 is able to overcome this type of external force, and remain reliably fixed at each of the prescribed positions.

During driving of the motor M, when the concave engagement members 21 and the convex engagement members 22 coincide, the convex engagement members 22 are forced into the corresponding concave engagement members 21, and the engagement of the two sets of members determines the rotational angle. At this point, the increase in torque will cause an increase in the driving current within the motor M, and by detecting this current increase, a determination can be made that the mirror 30 has reached the storage position or the working position, and the motor M can then be stopped based on this information. Consequently, the rotational angle can be detected without the need to provide a separate rotational angle detecting mechanism with a sensor or the like, thereby enabling a low cost electric retractable mirror of compact construction to be provided.

In those cases in which the mirror 30 contacts a pedestrian or an obstacle or the like, and the output inner ring 12 is subjected to a large reverse input torque exceeding the spring sliding torque of the second elastic member 24, the convex engagement members 22 are pushed up over the level difference provided by the concave engagement members 21 and disengage from the concave engagement members 21. Following disengagement, the output inner ring 12 slips freely, thereby absorbing the external force, and so damage to the mirror 30 can be prevented. At this time, the reverse input torque is not transmitted to the motor M or the reduction gear R, and so damage to these mechanisms can also be prevented.

Figure 27B:
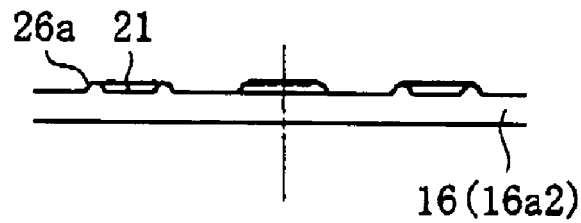
Figure 28A:
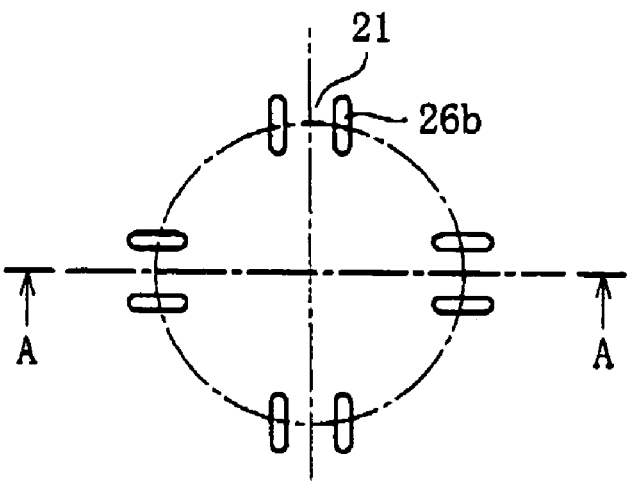
FIG. 28a is a plan view showing an embodiment of a concave engagement section.
Figure 28B:
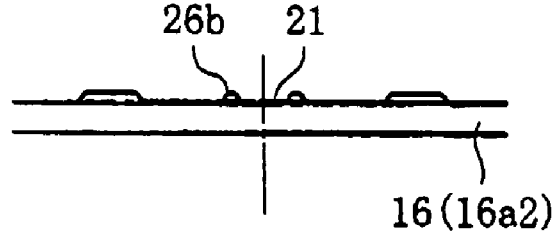
Figure 29:
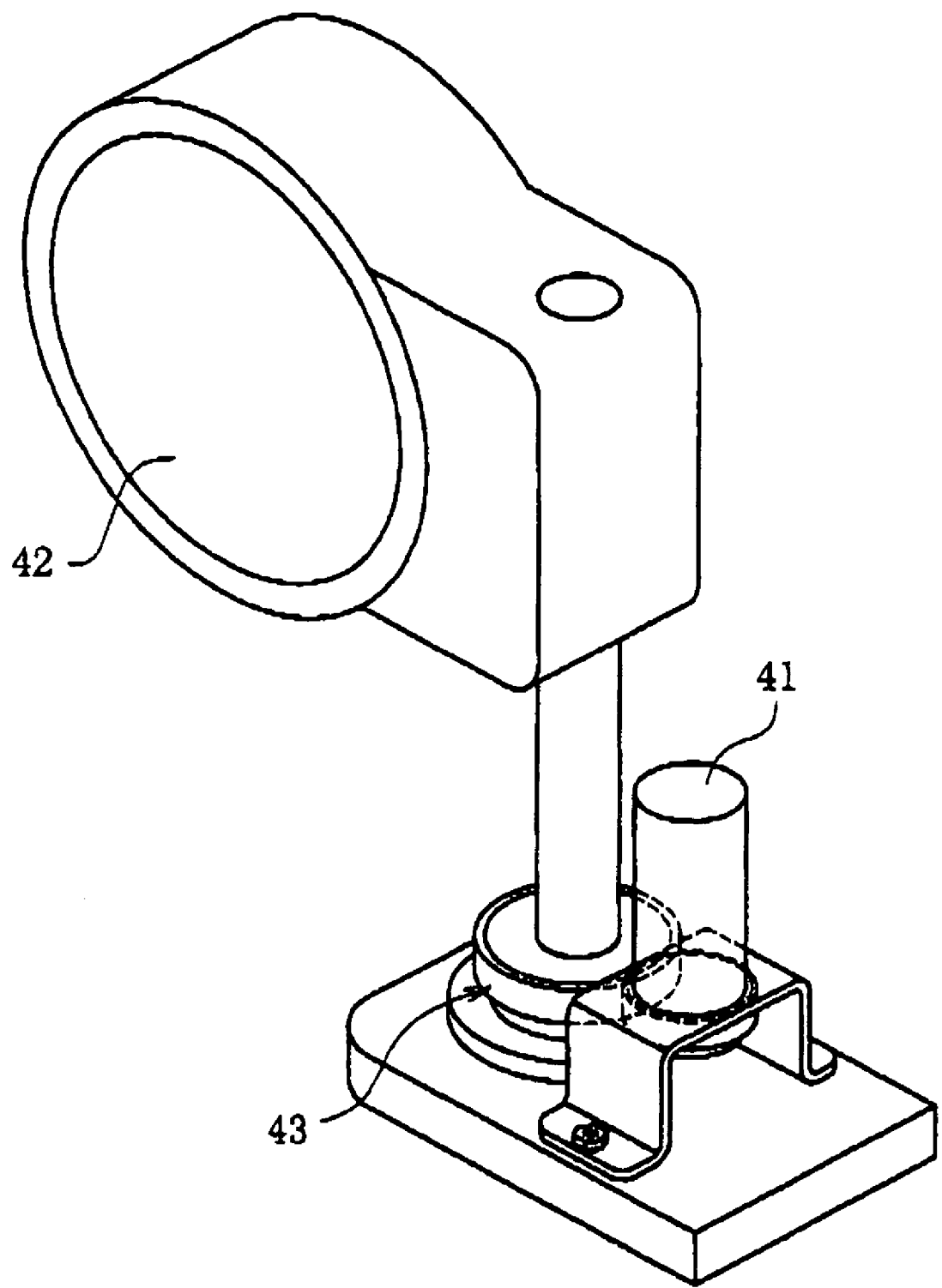
FIG. 29 is a perspective view showing an example of an electric retractable mirror.

In addition to the method described above, in which the concave engagement members 21 were formed by creating partial depressions in the inner surface, the concave engagement members 21 can also be generated by forming circular protrusions 26a on the inner surface, as shown in FIG. 27. In such a case, the increase in the motor current value will begin before the engagement of the engagement members 21, 22, and so reliable engagement of the engagement members 21, 22 can be ensured by stopping the motor M at the point where the current value has peaked and is beginning to decline. FIG. 28 shows an example in which the concave engagement members 21 are produced by forming two linear protrusions 26b which are orthogonal to the rotational direction of the convex engagement members 22.

In this embodiment, the concave engagement members 21 are provided on the first side plate 16a of the stationary side, and the convex engagement members 22 are provided on the output inner ring 12 of the rotating side, but the opposite case is also possible, wherein the concave engagement members 21 are provided on a rotating member (such as the output inner ring 12) and the convex engagement members 22 are provided on a stationary member (such as the first side plate 16a). Furthermore, in this embodiment four of each of the concave engagement members 21 and the convex engagement members 22 were provided, but provided one of either the convex or concave members is provided at two positions separated by 90°, one or more of the other members will suffice.

In the above description, the mirror section of an electric retractable mirror of a vehicle was used as an example of the driven member, but provided the driven member is an object to be positioned in at least two prescribed positions, then any member can be used as the driven member. Suitable alternative examples include opening and closing devices (such as a door, a shutter, a sunroof, or an electric sliding door) which are opened and closed between two prescribed positions. Moreover, the number of prescribed positions for positioning the driven member is not limited to two, and devices with three or more positions are also possible. In such cases, the number of engagement positions for the concave engagement members 21 and the convex engagement members 22 must also be increased or decreased in accordance with the number of positioning positions.

As described above, according to the present invention, a reverse input blocking clutch transmits input torque from a rotational driving source to a driven member, while blocking the transmission of reverse input torque applied to the output member back to the input member. Consequently, the input side (the motor and the reduction gear and the like) is not subjected to reverse driving arising from reverse input torque from the output member, and so damage to the members on the input side can be prevented. Furthermore, if the reverse input torque is small, the driven member is retained at a prescribed position, whereas if the reverse input torque is large, the output member is allowed to slip freely, thereby absorbing the impact of the external force and preventing damage to the driven member such as a mirror.

In addition, in those cases in which the mechanism disclosed in the above publication (Japanese Patent Laid-Open Publication No. Hei 11-51092) is actually employed within an electric retractable mirror, then the rotational angle of the mirror must be detected, and the motor stopped when the mirror is detected as having reached the storage position or the working position. As a result, a sensor for detecting the rotational angle and a control system for processing the detection signals must also be provided, which leads to a more complicated structure, whereas in the present invention, this detection and control is performed by restraining means which utilizes elastic force, and so such complicated structures are unnecessary.

What is claimed is:

1. A method of manufacturing a reverse input blocking clutch, the clutch comprising: an input member into which torque is input, an output member to which torque is output, a stationary member, locking means provided between said stationary member and said output member for locking said output member and said stationary member with respect to reverse input torque from said output member, lock release means provided on said input member for releasing a locked state produced by said locking means with respect to input torque from said input member, and torque transmission means provided between said input member and said output member for transmitting input torque from said input member to said output member when a locked state produced by said locking means is released, said torque transmitting means including a protrusion provided on the output member and an edge of a notch or an opening provided on the input member to engage said protrusion, wherein the method comprises the step of:

producing said input member and said output member from amongst said input member, said output member and said stationary member by press working of a metal plate.

* * * * *